(12) United States Patent
Bhaskar S et al.

(10) Patent No.: US 11,539,709 B2
(45) Date of Patent: Dec. 27, 2022

(54) RESTRICTED ACCESS TO SENSITIVE CONTENT

(71) Applicant: Citrix Systems, Inc., Fort Lauderdale, FL (US)

(72) Inventors: Hari Bhaskar S, Bangalore (IN); Deepak Sharma, Bengaluru (IN); Arvind SankaraSubramanian, Bangalore (IN); Madhura Keshava Ummettuguli, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 458 days.

(21) Appl. No.: 16/725,295

(22) Filed: Dec. 23, 2019

(65) Prior Publication Data

US 2021/0194888 A1    Jun. 24, 2021

(51) Int. Cl.
| | | |
|---|---|---|
| H04L 9/40 | (2022.01) | |
| G06F 9/54 | (2006.01) | |
| H04L 67/306 | (2022.01) | |
| G06N 20/00 | (2019.01) | |
| G06N 5/04 | (2006.01) | |
| G06F 16/33 | (2019.01) | |

(52) U.S. Cl.
CPC ............ *H04L 63/105* (2013.01); *G06F 9/541* (2013.01); *G06F 16/3347* (2019.01); *G06N 5/04* (2013.01); *G06N 20/00* (2019.01); *H04L 67/306* (2013.01)

(58) Field of Classification Search
None
See application file for complete search history.

(56) References Cited

U.S. PATENT DOCUMENTS

| | | |
|---|---|---|
| 5,801,697 A | 9/1998 | Parikh |
| 6,429,883 B1 | 8/2002 | Plow |
| 6,937,730 B1 | 8/2005 | Buxton |
| 7,729,480 B1 | 6/2010 | Packingham |
| 8,219,766 B1 | 7/2012 | Orcutt |
| 8,578,504 B2 | 11/2013 | Brown et al. |
| 8,726,343 B1 | 5/2014 | Borzycki |

(Continued)

FOREIGN PATENT DOCUMENTS

| | | |
|---|---|---|
| CN | 102938801 A | 2/2013 |
| CN | 103218568 A | 7/2013 |

(Continued)

OTHER PUBLICATIONS

European Patent Office Communication pursuant to Article 94(3) EPC for App. No. EP19207955.6, dated Mar. 17, 2022, 5 pages.

(Continued)

*Primary Examiner* — Otis L Thompson, Jr.
(74) *Attorney, Agent, or Firm* — Daly, Crowley, Mofford & Durkee, LLP

(57) ABSTRACT

In one aspect, the present disclosure relates to a method including: receiving, by a client device, a request to access content stored on a remote server; determining, by the client device, that the requested content includes sensitive information based on a user profile associated with the client device; modifying, by the client device, the requested content in response to the determination that the content includes sensitive information; and providing, by client device, access to the modified content in place of the requested content that includes the sensitive information.

20 Claims, 15 Drawing Sheets

(56) References Cited

U.S. PATENT DOCUMENTS

| | | | |
|---|---|---|---|
| 8,799,668 | B2 | 8/2014 | Cheng |
| 8,826,169 | B1 | 9/2014 | Yacoub |
| 8,914,892 | B2 | 12/2014 | Karande et al. |
| 9,015,082 | B1* | 4/2015 | Jaiswal ............... G06F 21/6227 706/12 |
| 9,082,136 | B1 | 7/2015 | Hewinson |
| 9,137,232 | B2 | 9/2015 | Eschbach et al. |
| 9,268,398 | B2 | 2/2016 | Tipirneni |
| 9,466,266 | B2 | 10/2016 | Hildreth et al. |
| 9,574,671 | B1 | 2/2017 | Amberg |
| 9,626,528 | B2 | 4/2017 | Butler |
| 9,680,836 | B2 | 6/2017 | White |
| 9,691,027 | B1* | 6/2017 | Sawant ................. G06F 21/556 |
| 9,767,585 | B1 | 9/2017 | Carter, Jr. |
| 9,898,619 | B1 | 2/2018 | Hadsall |
| 9,977,909 | B1 | 5/2018 | Austin et al. |
| 10,032,037 | B1 | 7/2018 | Allen |
| 10,043,033 | B1 | 8/2018 | Hadsall |
| 10,255,053 | B2 | 4/2019 | Giri et al. |
| 10,305,683 | B1 | 5/2019 | Ghafourifar et al. |
| 10,325,103 | B1 | 6/2019 | Austin |
| 10,430,350 | B1 | 10/2019 | Nimry et al. |
| 10,438,010 | B1 | 10/2019 | Goodsitt |
| 10,511,698 | B1 | 12/2019 | Chen |
| 10,552,585 | B2 | 2/2020 | Verthein et al. |
| 10,614,454 | B1 | 4/2020 | Brooks, V |
| 10,664,615 | B1 | 5/2020 | Schenkein |
| 10,686,824 | B2 | 6/2020 | Petry et al. |
| 10,701,079 | B1 | 6/2020 | Ledet |
| 10,853,019 | B1 | 12/2020 | Schwabacher |
| 11,184,406 | B1 | 11/2021 | Shashank |
| 2004/0193910 | A1 | 9/2004 | Moles |
| 2005/0240533 | A1 | 10/2005 | Cutter |
| 2005/0277428 | A1 | 12/2005 | Nathan Brown |
| 2006/0075040 | A1 | 4/2006 | Chmaytelli |
| 2006/0129948 | A1 | 6/2006 | Hamzy et al. |
| 2006/0277220 | A1 | 12/2006 | Patrick |
| 2007/0005713 | A1 | 1/2007 | LeVasseur |
| 2007/0103552 | A1 | 5/2007 | Patel |
| 2008/0034373 | A1 | 2/2008 | Glynn |
| 2008/0103799 | A1 | 5/2008 | Domenikos |
| 2008/0148067 | A1 | 6/2008 | Sitrick |
| 2008/0226199 | A1 | 9/2008 | Breglio |
| 2008/0266467 | A1 | 10/2008 | Okamoto |
| 2009/0147958 | A1 | 6/2009 | Calcaterra |
| 2009/0257591 | A1 | 10/2009 | Mithal et al. |
| 2009/0259967 | A1 | 10/2009 | Davidson |
| 2009/0262931 | A1 | 10/2009 | Nakagata |
| 2010/0045570 | A1 | 2/2010 | Takata |
| 2010/0049743 | A1 | 2/2010 | Schmidt |
| 2010/0110095 | A1 | 5/2010 | Sekiguchi |
| 2010/0161644 | A1 | 6/2010 | Crim et al. |
| 2010/0205667 | A1 | 8/2010 | Anderson |
| 2010/0251374 | A1 | 9/2010 | Dill |
| 2010/0275267 | A1 | 10/2010 | Walker |
| 2011/0029774 | A1 | 2/2011 | Zunke |
| 2011/0032913 | A1 | 2/2011 | Patil et al. |
| 2011/0088086 | A1 | 4/2011 | Swink |
| 2011/0161656 | A1* | 6/2011 | Rao .................... H04L 63/0281 713/168 |
| 2011/0251992 | A1 | 10/2011 | Bethlehem et al. |
| 2011/0258195 | A1* | 10/2011 | Welling ............... G06V 30/182 707/E17.09 |
| 2011/0302442 | A1 | 12/2011 | Garrett et al. |
| 2012/0005475 | A1 | 1/2012 | Inagaki |
| 2012/0023571 | A1 | 1/2012 | Spies |
| 2012/0098639 | A1 | 4/2012 | Ijas |
| 2012/0110174 | A1 | 5/2012 | Wootton |
| 2012/0198368 | A1 | 8/2012 | Bornheimer et al. |
| 2012/0226742 | A1 | 9/2012 | Momchilov et al. |
| 2012/0260307 | A1 | 10/2012 | Sambamurthy |
| 2012/0303558 | A1* | 11/2012 | Jaiswal ................. G06N 20/00 706/12 |
| 2012/0323717 | A1 | 12/2012 | Kirsch |
| 2013/0007895 | A1 | 1/2013 | Brolley |
| 2013/0019186 | A1 | 1/2013 | Lance |
| 2013/0054635 | A1 | 2/2013 | Phelps |
| 2013/0117670 | A1 | 5/2013 | Mahajan et al. |
| 2013/0145457 | A1 | 6/2013 | Papakipos et al. |
| 2013/0162817 | A1 | 6/2013 | Bernal |
| 2013/0172027 | A1 | 7/2013 | Sturges et al. |
| 2013/0201534 | A1 | 8/2013 | Carlen et al. |
| 2013/0298076 | A1 | 11/2013 | Rice |
| 2013/0339744 | A1 | 12/2013 | Nagai et al. |
| 2013/0344966 | A1 | 12/2013 | Mustafa |
| 2014/0053232 | A1 | 2/2014 | Coles |
| 2014/0195798 | A1 | 7/2014 | Brugger et al. |
| 2014/0201527 | A1 | 7/2014 | Krivorot |
| 2014/0215356 | A1 | 7/2014 | Brander et al. |
| 2014/0259184 | A1 | 9/2014 | Hoyer |
| 2014/0268244 | A1 | 9/2014 | Sheridan |
| 2014/0280509 | A1* | 9/2014 | Merrells ................. H04L 67/02 709/203 |
| 2014/0283127 | A1* | 9/2014 | Chacko ............... H04L 63/0428 726/28 |
| 2014/0351955 | A1 | 11/2014 | White |
| 2015/0058997 | A1 | 2/2015 | Lee et al. |
| 2015/0074506 | A1 | 3/2015 | Dunn |
| 2015/0074615 | A1 | 3/2015 | Han |
| 2015/0089357 | A1 | 3/2015 | Vandervort |
| 2015/0113666 | A1 | 4/2015 | Buck |
| 2015/0149529 | A1* | 5/2015 | Loader .................... H04L 67/10 709/203 |
| 2015/0200922 | A1 | 7/2015 | Eschbach et al. |
| 2015/0271206 | A1 | 9/2015 | Schultz |
| 2015/0278534 | A1 | 10/2015 | Thiyagarajan et al. |
| 2015/0281446 | A1 | 10/2015 | Milstein |
| 2015/0287279 | A1 | 10/2015 | Nichols |
| 2015/0288633 | A1 | 10/2015 | Ogundokun et al. |
| 2015/0346959 | A1 | 12/2015 | Ruben et al. |
| 2015/0350136 | A1 | 12/2015 | Flynn, III |
| 2016/0011731 | A1 | 1/2016 | Pasquero |
| 2016/0050526 | A1 | 2/2016 | Liu |
| 2016/0054911 | A1 | 2/2016 | Edwards et al. |
| 2016/0078247 | A1 | 3/2016 | Tucker et al. |
| 2016/0092685 | A1 | 3/2016 | Tse |
| 2016/0098414 | A1 | 4/2016 | Edmonds |
| 2016/0099935 | A1 | 4/2016 | Luskin et al. |
| 2016/0100046 | A1 | 4/2016 | Meru |
| 2016/0112209 | A1 | 4/2016 | Yoon et al. |
| 2016/0156638 | A1 | 6/2016 | Somani |
| 2016/0179454 | A1 | 6/2016 | Liu |
| 2016/0188883 | A1 | 6/2016 | Wang et al. |
| 2016/0188973 | A1 | 6/2016 | Ziaja et al. |
| 2016/0191442 | A1 | 6/2016 | Penilla et al. |
| 2016/0255084 | A1 | 9/2016 | White |
| 2016/0261735 | A1 | 9/2016 | Candelore |
| 2016/0269440 | A1 | 9/2016 | Hartman |
| 2016/0270648 | A1 | 9/2016 | Freeman |
| 2016/0294823 | A1* | 10/2016 | McKeithan, II ...... G06F 1/1686 |
| 2016/0307002 | A1 | 10/2016 | Zha |
| 2016/0328522 | A1 | 11/2016 | Howley |
| 2016/0378869 | A1 | 12/2016 | Nittka |
| 2017/0004331 | A1 | 1/2017 | Weldon |
| 2017/0032150 | A1 | 2/2017 | Hamlin |
| 2017/0061409 | A1 | 3/2017 | Morecki |
| 2017/0068829 | A1 | 3/2017 | Shaw |
| 2017/0134645 | A1 | 5/2017 | Kim |
| 2017/0187751 | A1* | 6/2017 | Andrews ............... H04L 63/102 |
| 2017/0249432 | A1 | 8/2017 | Grantcharov |
| 2017/0264506 | A1 | 9/2017 | Singhal |
| 2017/0323099 | A1 | 11/2017 | Song |
| 2017/0351909 | A1 | 12/2017 | Kaehler |
| 2017/0364595 | A1 | 12/2017 | Desai et al. |
| 2017/0372527 | A1 | 12/2017 | Murali et al. |
| 2018/0014150 | A1 | 1/2018 | Elias |
| 2018/0053003 | A1 | 2/2018 | Nair |
| 2018/0054414 | A1 | 2/2018 | Levasseur |
| 2018/0071634 | A1 | 3/2018 | Carvallo et al. |
| 2018/0082068 | A1 | 3/2018 | Lancioni et al. |
| 2018/0122506 | A1 | 5/2018 | Grantcharov et al. |
| 2018/0124027 | A1 | 5/2018 | Venkiteswaran |
| 2018/0136898 | A1 | 5/2018 | Shi et al. |
| 2018/0145835 | A1 | 5/2018 | Barbour et al. |

(56) References Cited

U.S. PATENT DOCUMENTS

| | | |
|---|---|---|
| 2018/0150647 A1 | 5/2018 | Naqvi et al. |
| 2018/0164589 A1 | 6/2018 | Watanabe |
| 2018/0165427 A1 | 6/2018 | Verthein |
| 2018/0183581 A1 | 6/2018 | Elbaz et al. |
| 2018/0189461 A1 | 7/2018 | Ghafourifar |
| 2018/0189504 A1 | 7/2018 | Ghafourifar |
| 2018/0189505 A1 | 7/2018 | Ghafourifar |
| 2018/0191686 A1 | 7/2018 | Ghafourifar |
| 2018/0191701 A1 | 7/2018 | Kong et al. |
| 2018/0225019 A1 | 8/2018 | Xie |
| 2018/0262480 A1 | 9/2018 | Doi et al. |
| 2018/0276393 A1 | 9/2018 | Allen et al. |
| 2018/0285591 A1 | 10/2018 | Thayer et al. |
| 2018/0285592 A1 | 10/2018 | Sharifi et al. |
| 2018/0321826 A1 | 11/2018 | Bereza |
| 2018/0337918 A1 | 11/2018 | Chang et al. |
| 2018/0343321 A1 | 11/2018 | Chang |
| 2018/0351961 A1 | 12/2018 | Calcaterra et al. |
| 2019/0012646 A1 | 1/2019 | Seidl et al. |
| 2019/0013646 A1 | 1/2019 | Tan et al. |
| 2019/0019177 A1 | 1/2019 | Lee et al. |
| 2019/0042059 A1 | 2/2019 | Baer |
| 2019/0050592 A1 | 2/2019 | Grau |
| 2019/0068687 A1 | 2/2019 | Masi |
| 2019/0073490 A1 | 3/2019 | Agrawal et al. |
| 2019/0080072 A1 | 3/2019 | Van Os et al. |
| 2019/0102263 A1 | 4/2019 | Singh et al. |
| 2019/0102574 A1 | 4/2019 | Roberts et al. |
| 2019/0147169 A1 | 5/2019 | Adams |
| 2019/0171794 A1 | 6/2019 | Dhruva et al. |
| 2019/0220609 A1 | 7/2019 | Ghazanfari |
| 2019/0266337 A1 | 8/2019 | Sengupta |
| 2019/0278940 A1 | 9/2019 | Huang |
| 2019/0278961 A1 | 9/2019 | Schrader et al. |
| 2019/0279344 A1 | 9/2019 | Duggal |
| 2019/0289419 A1 | 9/2019 | Eronen |
| 2019/0306132 A1 | 10/2019 | Le Van Gong |
| 2019/0327215 A1 | 10/2019 | Bastian et al. |
| 2019/0349366 A1 | 11/2019 | Dewan et al. |
| 2019/0361572 A1 | 11/2019 | Webber |
| 2019/0386971 A1 | 12/2019 | Venkiteswaran et al. |
| 2020/0004983 A1* | 1/2020 | Chen ............ H04L 9/0819 |
| 2020/0012793 A1 | 1/2020 | Avraham et al. |
| 2020/0019729 A1 | 1/2020 | Shanmugam et al. |
| 2020/0026394 A1 | 1/2020 | Rodolico |
| 2020/0028836 A1 | 1/2020 | Gandhi et al. |
| 2020/0065514 A1 | 2/2020 | Keen |
| 2020/0074090 A1 | 3/2020 | Naqvi et al. |
| 2020/0074109 A1 | 3/2020 | Pieniazek et al. |
| 2020/0104539 A1 | 4/2020 | Liu |
| 2020/0106749 A1 | 4/2020 | Jain et al. |
| 2020/0110301 A1 | 4/2020 | Harrold et al. |
| 2020/0134240 A1 | 4/2020 | Balakrishna |
| 2020/0151243 A1 | 5/2020 | Chauhan |
| 2020/0151348 A1 | 5/2020 | Chauhan |
| 2020/0153911 A1 | 5/2020 | Chauhan |
| 2020/0175209 A1 | 6/2020 | Yost |
| 2020/0175610 A1 | 6/2020 | Pikle |
| 2020/0193031 A1 | 6/2020 | Avraham et al. |
| 2020/0228561 A1 | 7/2020 | Petry et al. |
| 2020/0310945 A1 | 10/2020 | Scoda |
| 2020/0311304 A1* | 10/2020 | Parthasarathy ..... G06F 11/3006 |
| 2020/0320638 A1 | 10/2020 | Erickson et al. |
| 2020/0349271 A1* | 11/2020 | Binkley ............ G06F 21/6245 |
| 2020/0380146 A1 | 12/2020 | Dodor et al. |
| 2021/0019441 A1 | 1/2021 | Neves Creto |
| 2021/0021573 A1* | 1/2021 | Scotney ............ G06F 16/955 |
| 2021/0049280 A1 | 2/2021 | Koshy |
| 2021/0051294 A1 | 2/2021 | Roedel et al. |
| 2021/0350033 A1 | 11/2021 | Kapinos |
| 2022/0021721 A1 | 1/2022 | Liu |
| 2022/0164400 A1* | 5/2022 | Holloway ............ H04L 67/568 |
| 2022/0164472 A1* | 5/2022 | Cannon ............ G06F 21/6245 |
| 2022/0164589 A1* | 5/2022 | Upshinskii ............ G06N 3/04 |

FOREIGN PATENT DOCUMENTS

| | | |
|---|---|---|
| CN | 104794405 A | 7/2015 |
| CN | 105162693 A | 12/2015 |
| CN | 106716436 A | 5/2017 |
| CN | 106933465 A | 7/2017 |
| CN | 108509169 A | 9/2018 |
| CN | 105976303 B | 3/2019 |
| CN | 110378145 A | 10/2019 |
| CN | 110998573 A | 4/2020 |
| CN | 111338744 A | 6/2020 |
| EP | 2874396 A1 | 5/2015 |
| EP | 3337210 A1 | 6/2018 |
| JP | 2011248762 A | 12/2011 |
| JP | 2012198658 A | 10/2012 |
| KR | 100837815 B1 | 6/2008 |
| KR | 20150066129 A | 6/2015 |
| WO | WO 2013/101084 A1 | 7/2013 |
| WO | 2015120677 A1 | 8/2015 |
| WO | WO2016205241 A | 12/2016 |
| WO | WO2018102286 | 6/2018 |

OTHER PUBLICATIONS

Office Action (Non-Final Rejection) dated Mar. 30, 2022 for U.S. Appl. No. 16/185,724 (pp. 1-13).

PCT Invitation to Pay Additional Fees dated Mar. 16, 2021 for International Application No. PCT/US2020/062770; 12 pages.

U.S. Non-Final Office Action dated Apr. 13, 2021 for U.S. Appl. No. 16/716,669; 21 pages.

U.S. Appl. No. 16/716,669, filed Dec. 17, 2019, Singh.

U.S. Appl. No. 16/716,761, filed Dec. 17, 2019, Singh.

U.S. Appl. No. 16/835,928, filed Mar. 31, 2020, Singh.

U.S. Appl. No. 16/870,056, filed May 8, 2020, Jiang, et al.

U.S. Appl. No. 16/369,648, filed Mar. 29, 2019, Singh, et al.

U.S. Appl. No. 16/910,615, filed Jun. 24, 2020, Qiao, et al.

U.S. Appl. No. 16/185,724, filed Nov. 9, 2018, Chauhan.

U.S. Appl. No. 16/780,445, filed Feb. 3, 2020, Singh, et al.

European Search Report and Written Opinion dated Mar. 31, 2020 for EP Application No. 19207955.6; 9 Pages.

PCT International Search Report and Written Opinion dated Feb. 23, 2021 for International Application No. PCT/CN2020/091951; 9 pages.

PCT International Search Report and Written Opinion dated Feb. 16, 2021 for International Application No. PCT/US2020/061927; 13 pages.

U.S. Non-Final Office Action dated Mar. 4, 2021 for U.S. Appl. No. 17/073,773; 17 pages.

U.S. Non-Final Office Action dated Mar. 15, 2021 for U.S. Appl. No. 16/185,724; 14 pages.

U.S. Appl. No. 17/034,118, filed Sep. 28, 2020, Wang, et al.

U.S. Appl. No. 17/073,773, filed Oct. 19, 2020, Qian, et al.

Text Mask: Hide Confidential Page Content—Chrome Web Store; Downloaded from https://chrome.google.com/webstore/detail/text-mask-hide-confidenti/icodoomkkkhijlceahdabhkgdelffail?hl=en; Dec. 13, 2018; 6 pages.

"IBM Researchers Develop Shield to Mask Sensitive On-Screen Info" Downloaded from https://www.firstpost.com/business/biztech/ibm-researchers-develop-shield-to-mask-sensitive-on-screen-info-1873185.html; Jul. 10, 2009; 11 pages.

Goldsteen, et al., "Application-screen Masking: A Hybrid Approach;" Downloaded from https://www.firstpost.com/business/biztech/ibm-researchers-develop-shield-to-mask-sensitive-on-screen-info-1873185.html; Jul. 2015; 10 Pages.

U.S. Non-Final Office Action dated Jun. 6, 2019 for U.S. Appl. No. 16/185,724; 11 Pages.

U.S. Final Office Action dated Oct. 23, 2019 for U.S. Appl. No. 16/185,724; 12 Pages.

U.S. Non-Final Office Action dated Mar. 24, 2020 for U.S. Appl. No. 16/185,724; 11 Pages.

U.S. Final Office Action dated Sep. 9, 2020 for U.S. Appl. No. 16/185,724; 11 Pages.

U.S. Non-Final Office Action dated Apr. 30, 2021 for U.S. Appl. No. 16/369,648; 26 pages.

(56) References Cited

OTHER PUBLICATIONS

U.S. Final Office Action dated May 13, 2021 for U.S. Appl. No. 17/073,773; 14 pages.
PCT International Search Report and Written Opinion dated May 10, 2021 for International Application No. PCT/US2020/062770; 19 pages.
PCT International Search Report and Written Opinion dated Oct. 27, 2020 for International Application No. PCT/US2020/051150; 12 Pages.
Bickford et al., "Safe Internet Browsing using a Transparent Virtual Browser", 2015 IEEE 2nd International Conference on Cyber Security and Cloud Computing, pp. 423-432 (Year: 2015).
Examination Report dated Aug. 23, 2021 for European Application No. 19207955.6; 5 Pages.
Final Office Action dated Jul. 21, 2021 for U.S. Appl. No. 16/185,724; 14 Pages.
Forte, Andrea etal., "EyeDecrypt—Private Interaction in Plain Sight", https://citeseerx.ist.psu.edu/viewdoc/download?doi= 10.1.1.380.8867&rep=rep1&type=pdf, pp. 1-14 (Year: 2014).
Moreira et al., "Strategies for minimizing the influence of the use of BYOD and Cloud in organizations: 4CM Model", IEEE 11CCC 2016 (Year: 2016).
Non-Final Office Action dated Jul. 29, 2021 for U.S. Appl. No. 16/870,056; 11 Pages.
Office Action (Final Rejection) dated Aug. 30, 2021 for U.S. Appl. No. 16/716,669 (pp. 1-8).
PCT International Search Report and Written Opinion dated May 27, 2021 for International Application No. PCT/CN2020/112314; 9 pages.
U.S. Non-Final Office Action dated Dec. 10, 2020 for U.S. Appl. No. 16/780,445; 36 pages.
Office Action (Final Rejection) dated Jan. 26, 2022 for U.S. Appl. No. 16/870,056 (pp. 1-10).
U.S. Non-Final Office Action dated Feb. 16, 2021 for U.S. Appl. No. 17/034,118; 15 pages.
PCT International Search Report and Written Opinion dated May 26, 2021 for International Application No. PCT/CN2020/111793; 9 pages.
PCT International Search Report and Written Opinion dated Jun. 3, 2021 for International Application No. PCT/CN2020/112315; 9 pages.
U.S. Final Office Action dated Jun. 9, 2021 for U.S. Appl. No. 16/780,445; 37 pages.
Office Action (Non-Final Rejection) dated Dec. 21, 2021 for U.S. Appl. No. 16/716,669 (pp. 1-7).
Office Action (Non-Final Rejection) dated Mar. 7, 2022 for U.S. Appl. No. 16/716,761 (pp. 1-23).
Office Action (Non-Final Rejection) dated Jul. 8, 2022 for U.S. Appl. No. 16/910,615 (pp. 1-17).
Deep learning for source camera identification on mobile devices by David Freire-Obregón; Fabio Narducci; Silvio Barra; and Modesto Castrillón-Santana pp. 6; Available online Jan. 9, 2018.
Techniques for Position-Based Actions Using Light-Based Communication wo 2015148696 A1 (Machine Translation) Inventors: Aggarwal Anant; Breuer Christian; and Stout Barry pp. 14; Date Published: Oct. 1, 2015.
Camera recognition with deep learning by Eleni Athanasiadou, Zeno Geradts and Erwin Van Eijk pp. 9; (Year: 2018).
Method for Monitoring Event Related to Position_. JP 2001356978 A (Machine Translation) Inventors: I Anson Colin; Hawkes Rycharde Jeffery; Mcdonnell James Thomas Edward; Wilcock Lawrence and Crouch Simon E pp. 14; Date Published: Dec. 12, 2001.
Office Action (Final Rejection) dated Aug. 11, 2022 for U.S. Appl. No. 16/716,761 (pp. 1-25).
International Preliminary Report on Patentability issued in App. No. PCT/US2020/061927, dated Aug. 18, 2022, 8 pages.
International Preliminary Report on Patentability issued in App. No. PCT/US2020/051150, dated Jun. 30, 2022, 8 pages.
Hover-Over Content for User Interfaces, IPCOM000236793D, May 15, 2014, 37 pages (Year: 2015).
Office Action (Non-Final Rejection) dated Aug. 18, 2022 for U.S. Appl. No. 16/835,928 (pp. 1-24).
Office Action (Final Rejection) dated May 31, 2022 for U.S. Appl. No. 16/716,669 (pp. 1-8).
Office Action (Final Rejection) dated Jul. 14, 2022 for U.S. Appl. No. 16/780,445 (pp. 1-24).

\* cited by examiner

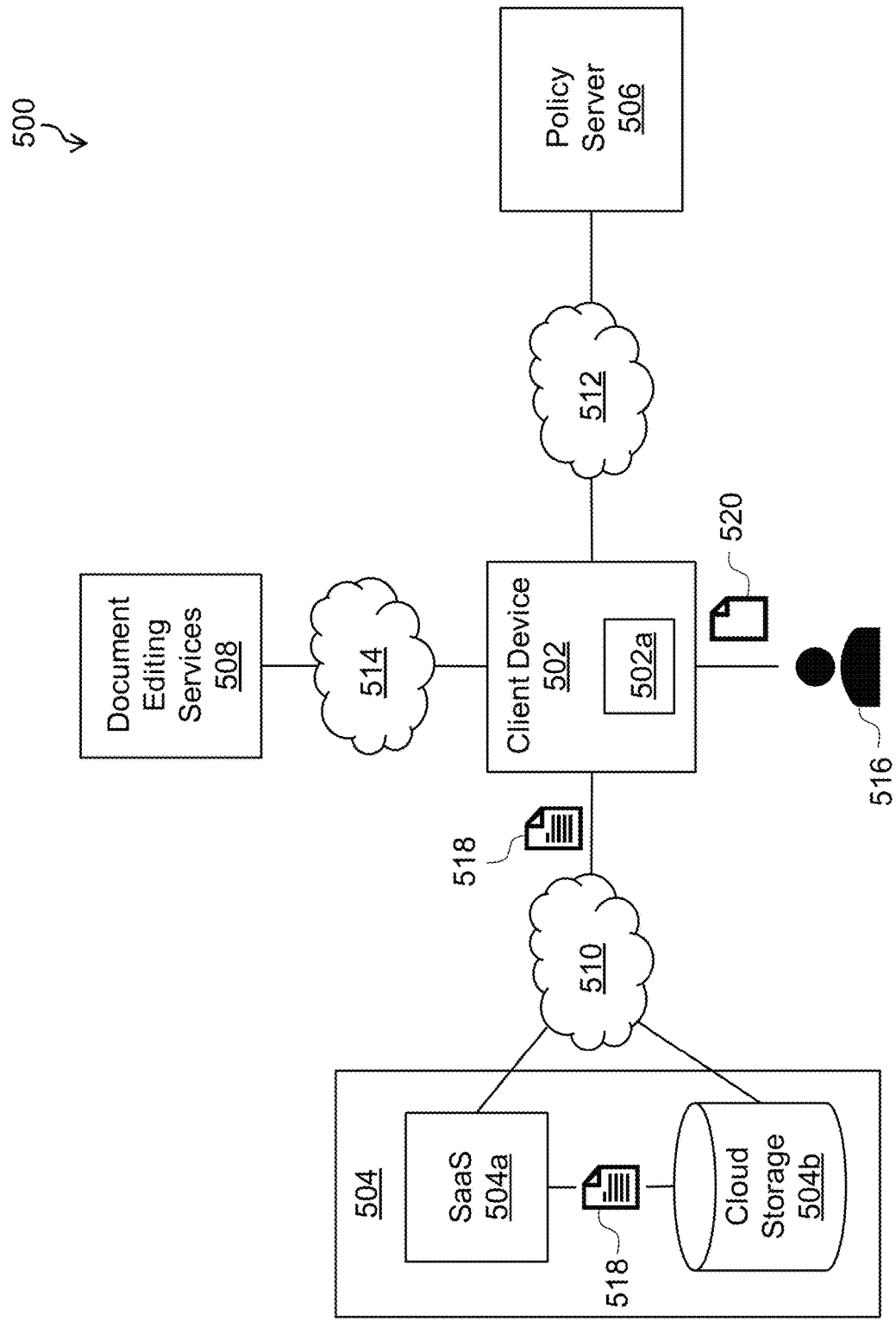

RESTRICTED ACCESS TO SENSITIVE CONTENT

BACKGROUND

As is known in the art, various types of organizations such as companies, enterprises, governments, agencies, firms, associations, etc. may generate, store, and access confidential or other types of sensitive content in networked computing environments. For example, an organization may store confidential documents in cloud/network storage or access confidential information using one or more Software-as-a-Service (SaaS) or remote desktop applications. An organization may grant its employees, contractors, agents, partners or other persons associated with organization permission to access various types of content over the network, including word processing documents, spreadsheets, image files, text files, and Portable Document Format (PDF) files.

SUMMARY

It is appreciated herein that, although some cloud services and other network resources may provide security controls for restricting access to content, such controls may not be co-extensive or compatible with the full range of security policies required or desired by a particular organization. For example, a given SaaS application may allow an organization to grant/restrict access to certain features and content for specific users or groups of users, however the SaaS application may not provide any mechanism for restricting access to content based on the user's location when accessing the content. As another example, while a cloud storage service may provide controls for restricting access to entire documents or other content, it may not provide the ability for a user to provide access to non-sensitive portions of a document while hiding sensitive information from the user. Moreover, cloud services may not have the ability to automatically detect and hide sensitive content, meaning that an organization's security or compliance team may have to manually configure security controls for individual documents, folders, etc. Embodiments of the present disclosure provide solutions to these and other technical problems described herein.

According to one aspect, the present disclosure relates to a method including: detecting, by a client device, a request to access content located on a remote server; determining, by the client device, that the requested content includes sensitive information based on a profile associated with the client device and a context in which the content is being accessed; modifying, by the client device, the requested content in response to the determination that the content includes sensitive information; and providing, by client device, access to the modified content in place of the requested content that includes the sensitive information.

In some embodiments, the determination that the requested content includes sensitive information can be further based on metadata associated with the content. In some embodiments, the determination that the requested content includes sensitive information can further includes analysis of the requested content using one or more models selected based on the user profile. In some embodiments, the method can further include selecting the one or more models based on attributes of an organization with which the requested content is associated.

In some embodiments, the determination that the requested content includes sensitive information can include: extracting text from the requested content; generating one or more feature vectors based on the extracted text; and using the one or more feature vectors and one or more trained models to detect the sensitive information of the requested content. In some embodiments, the extraction of the text from the requested content includes using Optical Character Recognition (OCR) to extract the text.

In some embodiments, the detection of the access to the requested content located on the remote server and the determination the requested content can include sensitive information is performed by a browser application of the client device. In some embodiments, the requested content may be located within a Software-as-a-Service (SaaS) application. In some embodiments, the modification of the requested content can include a change to a document using an application programming interface (API), and the API being selected based on a file type of the content. In some embodiments, the request to access the content can include a request to upload, download, share, copy, or paste the content.

According to another aspect, the present disclosure relates to a device including a memory and a processor. The processor can be coupled to the memory and configured to: access content of an application, the content including sensitive information, and the application being executable on a remote computing device; detect the sensitive information of the content based on at least one of a user profile and a context in which the content is being accessed; and modify the content in response to detection of the sensitive information, the modification enabling the computing device to replicate security controls applicable to local users of the application.

In some embodiments, the processor can be configured to detect the sensitive information of the content further based on metadata associated with the content. In some embodiments, the processor can be configured to detect the sensitive information of the content by analyzing the content using one or more models selected based on at least one of the user profile and the context in which the content is being accessed. In some embodiments, the processor may be configured to select the one or more models based on attributes of an organization with which the content is associated.

In some embodiments, the processor may be further configured to: extract text from the content; generate one or more feature vectors based on the extracted text; and use the one or more feature vectors and one or more trained models to detect the sensitive information of the content. In some embodiments, the processor can be configured to use Optical Character Recognition (OCR) to extract the text.

In some embodiments, the device may further include a browser application that, when executed by the processor, is operable to detect the sensitive information of the content and to modify the content in response to detection of the sensitive information. In some embodiments, the application can be a Software-as-a-Service (SaaS) application.

According to another aspect, the present disclosure relates to a method including: detecting, by a gateway device, a request to access content stored on a remote server, the request being associated with a client device; determining, by the gateway device, that the requested content includes sensitive information based on a user profile associated with the client device; modifying, by the gateway device, the requested content in response to the determination that the content includes sensitive information; and providing, by gateway device, access to the modified content in place of the requested content that includes the sensitive information.

In some embodiments, the determination that the requested content includes sensitive information further includes analysis of the requested content using one or more models selected based on the user profile associated with the client device.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

FIG. 5 is a block diagram of an illustrative network environment in which client devices can restrict access to sensitive content, according to an embodiment of the present disclosure.

The drawings are not necessarily to scale, or inclusive of all elements of a system, emphasis instead generally being placed upon illustrating the concepts, structures, and techniques sought to be protected herein.

DETAILED DESCRIPTION

Figure 1:
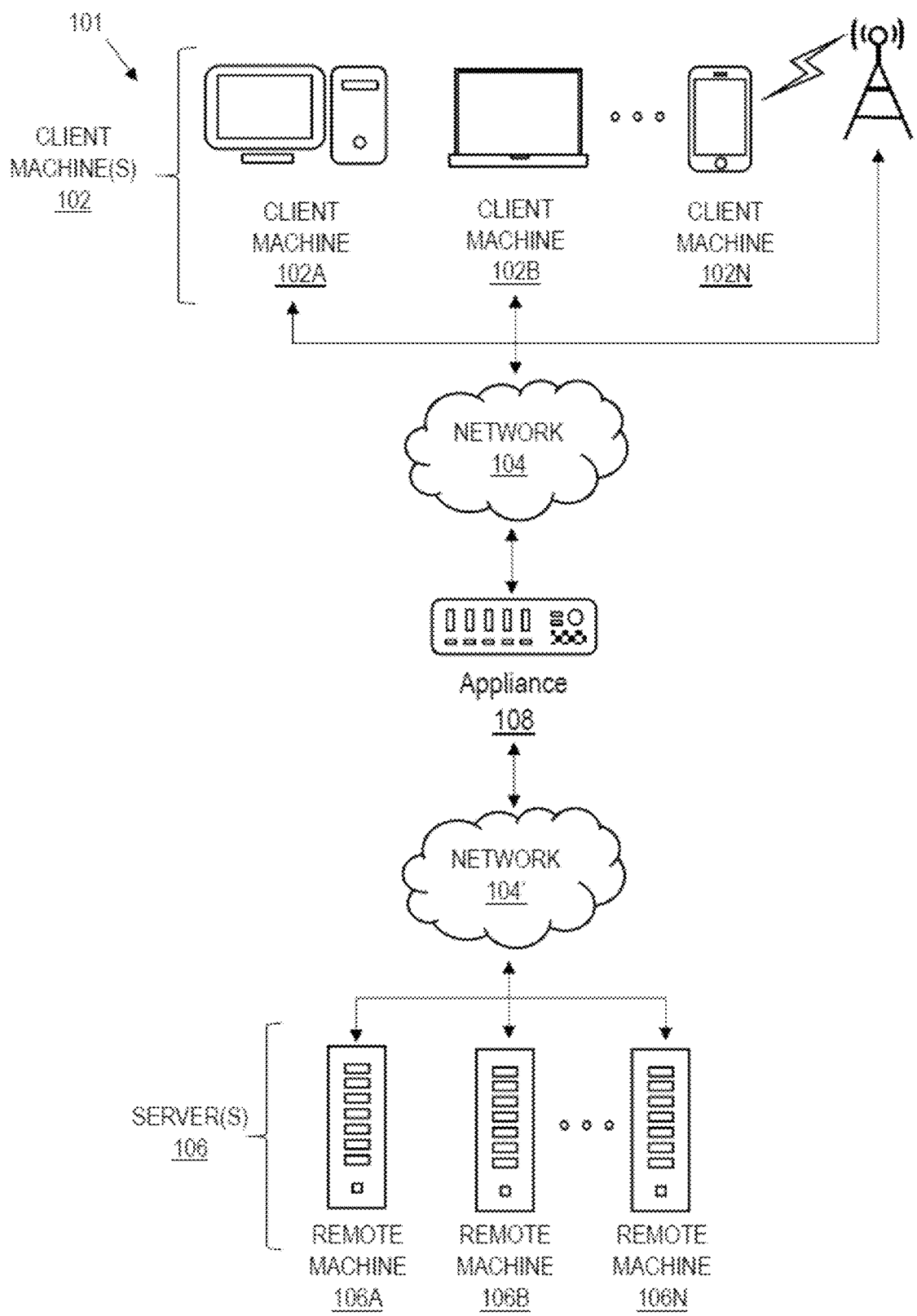
FIG. 1 is a diagram of an illustrative network computing environment in which embodiments of the present disclosure may be implemented.

Referring now to FIG. 1, shown is an illustrative network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
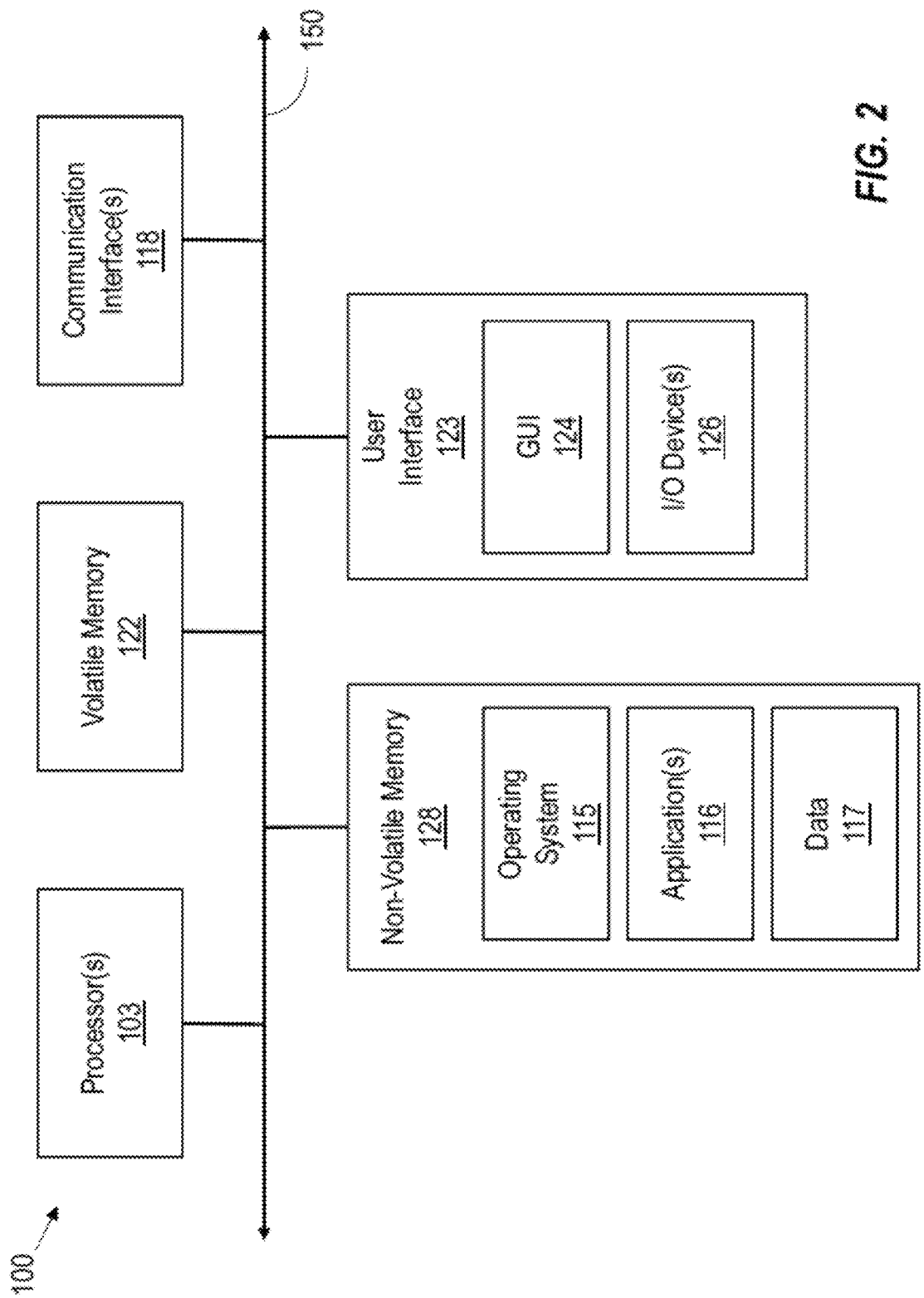
FIG. 2 is a block diagram of an illustrative computing device in which embodiments of the present disclosure may be implemented.

FIG. 2 is a block diagram illustrating selective components of an illustrative computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an illustrative client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed-signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
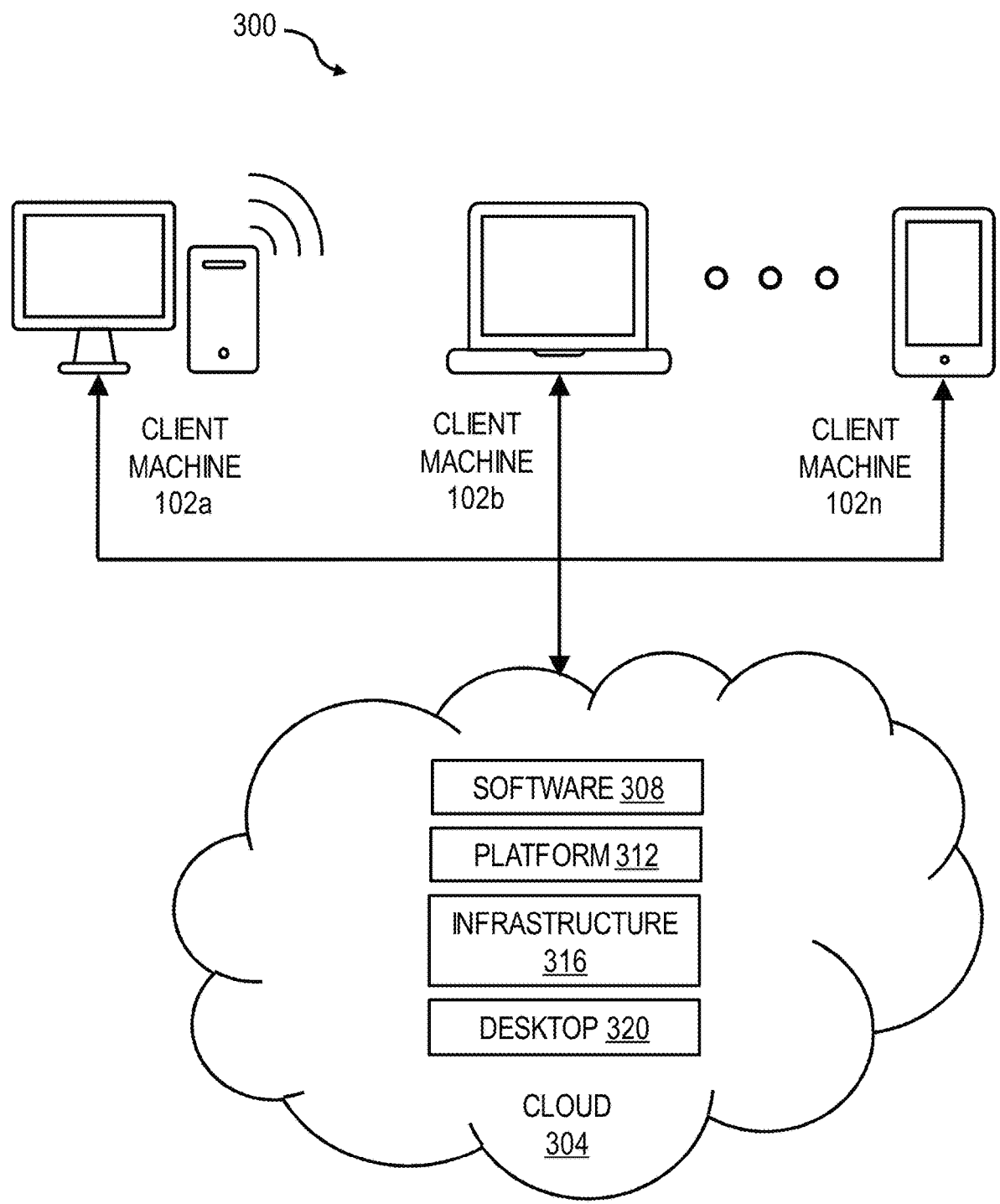
FIG. 3 is a diagram of an illustrative cloud computing environment in which embodiments of the present disclosure may be implemented.

Referring to FIG. 3, a cloud computing environment 300 is depicted, which may also be referred to as a cloud environment, cloud computing or cloud network. The cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 300, one or more clients 102a-102n (such as those described above) are in communication with a cloud network 304. The cloud network 304 may include back-end platforms, e.g., servers, storage, server farms or data centers. The users or clients 102a-102n can correspond to a single organization/tenant or multiple organizations/tenants. More particularly, in one illustrative implementation the cloud computing environment 300 may provide a private cloud serving a single organization (e.g., enterprise cloud). In another example, the cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 300 may provide a hybrid cloud that is a combination of a public cloud and a private cloud. Public clouds may include public servers that are maintained by third parties to the clients 102a-102n or the enterprise/tenant. The servers may be located off-site in remote geographical locations or otherwise.

The cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 300 can provide an elasticity to dynamically scale out or scale in response to different demands from one or more clients 102. In some embodiments, the cloud computing environment 300 can include or provide monitoring services to monitor, control and/or generate reports corresponding to the provided shared services and resources.

In some embodiments, the cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
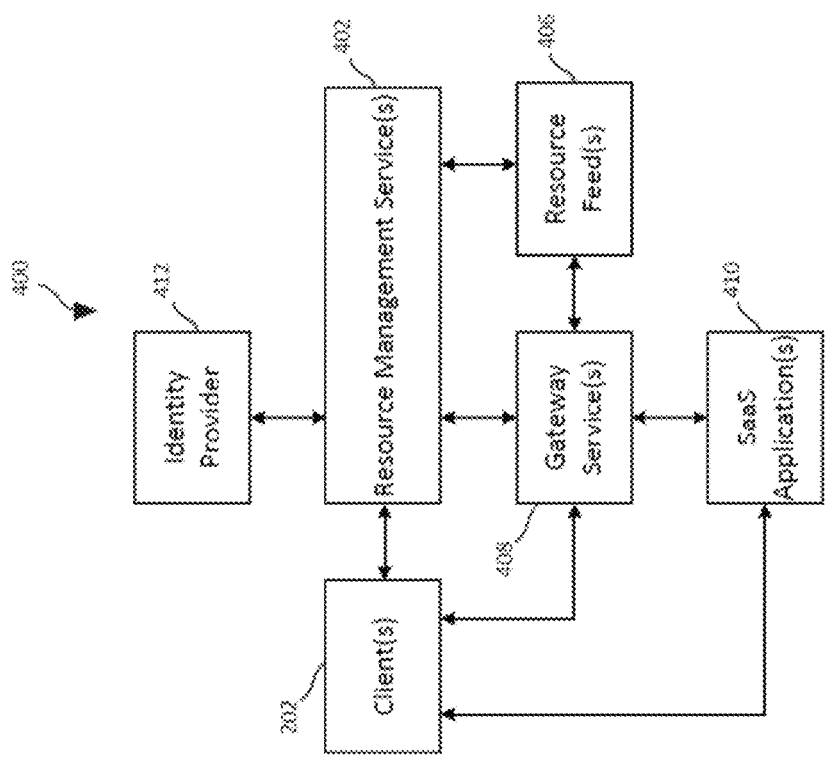
FIG. 4A is a block diagram of an illustrative system in which resource management services may manage and streamline access by clients to resource feeds (via one or more gateway services) and/or software-as-a-service (SaaS) applications.

FIG. 4A is a block diagram of an illustrative system 400 in which one or more resource management services 402 may manage and streamline access by one or more clients 202 to one or more resource feeds 406 (via one or more gateway services 408) and/or one or more software-as-a-service (SaaS) applications 410. In particular, the resource management service(s) 402 may employ an identity provider 412 to authenticate the identity of a user of a client 202 and, following authentication, identify one of more resources the user is authorized to access. In response to the user selecting one of the identified resources, the resource management service(s) 402 may send appropriate access credentials to the requesting client 202, and the client 202 may then use those credentials to access the selected resource. For the resource feed(s) 406, the client 202 may use the supplied credentials to access the selected resource via a gateway service 408. For the SaaS application(s) 410, the client 202 may use the credentials to access the selected application directly.

The client(s) 202 may be any type of computing devices capable of accessing the resource feed(s) 406 and/or the SaaS application(s) 410, and may, for example, include a variety of desktop or laptop computers, smartphones, tablets, etc. The resource feed(s) 406 may include any of numerous resource types and may be provided from any of numerous locations. In some embodiments, for example, the resource feed(s) 406 may include one or more systems or services for providing virtual applications and/or desktops to the client(s) 202, one or more file repositories and/or file sharing systems, one or more secure browser services, one or more access control services for the SaaS applications 410, one or more management services for local applications on the client(s) 202, one or more internet enabled devices or sensors, etc. Each of the resource management service(s) 402, the resource feed(s) 406, the gateway service(s) 408, the SaaS application(s) 410, and the identity provider 412 may be located within an on-premises data center of an organization for which the system 400 is deployed, within one or more cloud computing environments, or elsewhere.

Figure 4B:
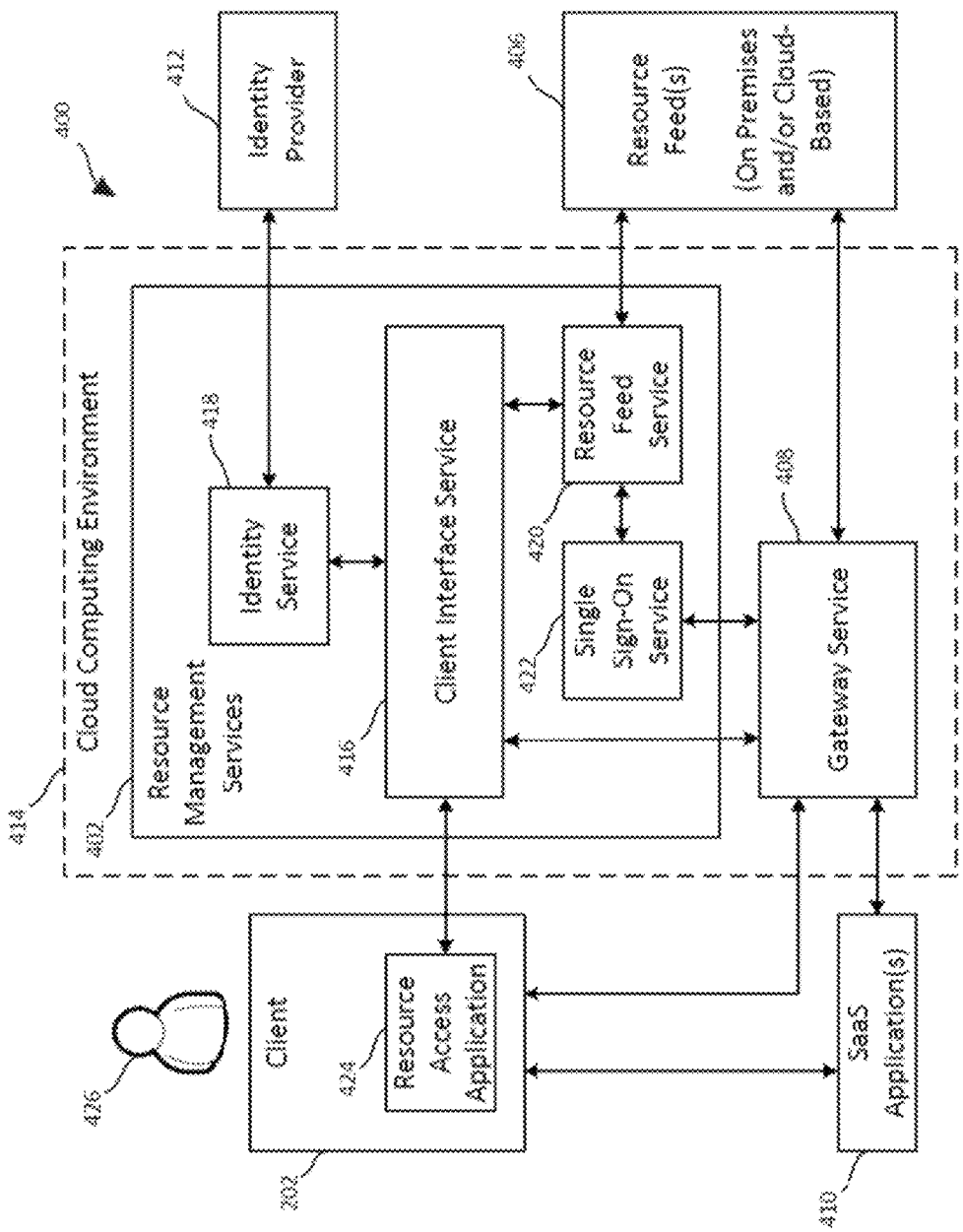
FIG. 4B is a block diagram showing an illustrative implementation of the system shown in FIG. 4A in which various resource management services as well as a gateway service are located within a cloud computing environment.

FIG. 4B is a block diagram showing an illustrative implementation of the system 400 shown in FIG. 4A in which various resource management services 402 as well as a gateway service 408 are located within a cloud computing environment 414. The cloud computing environment may, for example, include Microsoft Azure Cloud, Amazon Web Services, Google Cloud, or IBM Cloud.

For any of illustrated components (other than the client 202) that are not based within the cloud computing environment 414, cloud connectors (not shown in FIG. 4B) may be used to interface those components with the cloud computing environment 414. Such cloud connectors may, for example, run on Windows Server instances hosted in resource locations and may create a reverse proxy to route traffic between the site(s) and the cloud computing environment 414. In the illustrated example, the cloud-based resource management services 402 include a client interface service 416, an identity service 418, a resource feed service 420, and a single sign-on service 422. As shown, in some embodiments, the client 202 may use a resource access application 424 to communicate with the client interface service 416 as well as to present a user interface on the client 202 that a user 426 can operate to access the resource feed(s) 406 and/or the SaaS application(s) 410. The resource access application 424 may either be installed on the client 202, or may be executed by the client interface service 416 (or elsewhere in the system 400) and accessed using a web browser (not shown in FIG. 4B) on the client 202.

As explained in more detail below, in some embodiments, the resource access application 424 and associated components may provide the user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 424 is launched or otherwise accessed by the user 426, the client interface service 416 may send a sign-on request to the identity service 418. In some embodiments, the identity provider 412 may be located on the premises of the organization for which the system 400 is deployed. The identity provider 412 may, for example, correspond to an on-premises Windows Active Directory. In such embodiments, the identity provider 412 may be connected to the cloud-based identity service 418 using a cloud connector (not shown in FIG. 4B), as described above. Upon receiving a sign-on request, the identity service 418 may cause the resource access application 424 (via the client interface service 416) to prompt the user 426 for the user's authentication credentials (e.g., user-name and password). Upon receiving the user's authentication credentials, the client interface service 416 may pass the credentials along to the identity service 418, and the identity service 418 may, in turn, forward them to the identity provider 412 for authentication, for example, by comparing them against an Active Directory domain. Once the identity service 418 receives confirmation from the identity provider 412 that the user's identity has been properly authenticated, the client interface service 416 may send a request to the resource feed service 420 for a list of subscribed resources for the user 426.

In other embodiments (not illustrated in FIG. 4B), the identity provider 412 may be a cloud-based identity service, such as a Microsoft Azure Active Directory. In such embodiments, upon receiving a sign-on request from the client interface service 416, the identity service 418 may, via the client interface service 416, cause the client 202 to be redirected to the cloud-based identity service to complete an authentication process. The cloud-based identity service may then cause the client 202 to prompt the user 426 to enter the user's authentication credentials. Upon determining the user's identity has been properly authenticated, the cloud-based identity service may send a message to the resource access application 424 indicating the authentication attempt was successful, and the resource access application 424 may then inform the client interface service 416 of the successfully authentication. Once the identity service 418 receives confirmation from the client interface service 416 that the user's identity has been properly authenticated, the client interface service 416 may send a request to the resource feed service 420 for a list of subscribed resources for the user 426.

For each configured resource feed, the resource feed service 420 may request an identity token from the single sign-on service 422. The resource feed service 420 may then pass the feed-specific identity tokens it receives to the points of authentication for the respective resource feeds 406. Each resource feed 406 may then respond with a list of resources configured for the respective identity. The resource feed service 420 may then aggregate all items from the different feeds and forward them to the client interface service 416, which may cause the resource access application 424 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 410 to which the user 426 has subscribed. The lists of local applications and the SaaS applications 410 may, for example, be supplied by resource feeds 406 for respective services that manage which such applications are to be made available to the user 426 via the resource access application 424. Examples of SaaS applications 410 that may be managed and accessed as described herein include Microsoft Office 365 applications, SAP SaaS applications, Workday applications, etc.

For resources other than local applications and the SaaS application(s) 410, upon the user 426 selecting one of the listed available resources, the resource access application 424 may cause the client interface service 416 to forward a request for the specified resource to the resource feed service 420. In response to receiving such a request, the resource feed service 420 may request an identity token for the corresponding feed from the single sign-on service 422. The resource feed service 420 may then pass the identity token received from the single sign-on service 422 to the client interface service 416 where a launch ticket for the resource may be generated and sent to the resource access application 424. Upon receiving the launch ticket, the resource access application 424 may initiate a secure session to the gateway service 408 and present the launch ticket. When the gateway service 408 is presented with the launch ticket, it may initiate a secure session to the appropriate resource feed and present the identity token to that feed to seamlessly authenticate the user 426. Once the session initializes, the client 202 may proceed to access the selected resource.

When the user 426 selects a local application, the resource access application 424 may cause the selected local application to launch on the client 202. When the user 426 selects a SaaS application 410, the resource access application 424 may cause the client interface service 416 request a one-time uniform resource locator (URL) from the gateway service 408 as well a preferred browser for use in accessing the SaaS application 410. After the gateway service 408 returns the one-time URL and identifies the preferred browser, the client interface service 416 may pass that information along to the resource access application 424. The client 202 may then launch the identified browser and initiate a connection to the gateway service 408. The gateway service 408 may then request an assertion from the single sign-on service 422. Upon receiving the assertion, the gateway service 408 may cause the identified browser on the client 202 to be redirected to the logon page for identified SaaS application 410 and present the assertion. The SaaS may then contact the gateway service 408 to validate the assertion and authenticate the user 426. Once the user has been authenticated, communication may occur directly between the identified browser and the selected SaaS application 410, thus allowing the user 426 to use the client 202 to access the selected SaaS application 410.

In some embodiments, the preferred browser identified by the gateway service 408 may be a specialized browser embedded in the resource access application 424 (when the resource application is installed on the client 202) or provided by one of the resource feeds 406 (when the resource application 424 is located remotely), e.g., via a secure browser service. In such embodiments, the SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have the client interface service 416 send the link to a secure browser service, which may start a new virtual browser session with the client 202, and thus allow the user to access the potentially harmful linked content in a safe environment.

In some embodiments, in addition to or in lieu of providing the user 426 with a list of resources that are available to be accessed individually, as described above, the user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources-SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 426 of something that requires the user's attention (e.g., approval of an expense report, new course available for registration, etc.).

Figure 4C:
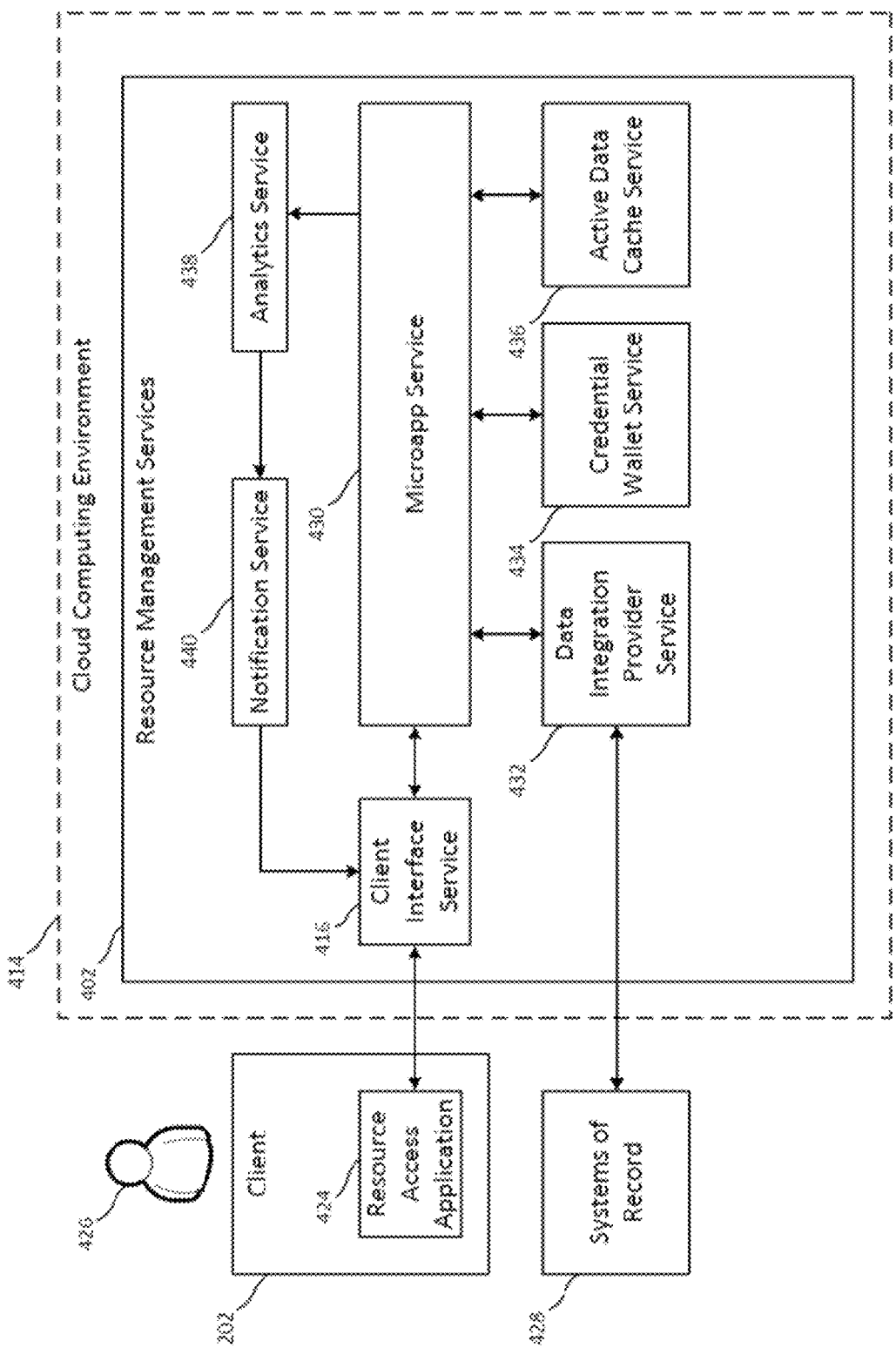
FIG. 4C is a block diagram similar to FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for a client 202. In the example shown, in addition to the client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 424 without having to launch the native application. The system shown in FIG. 4C may, for example, aggregate relevant notifications, tasks, and insights, and thereby give the user 426 a dynamic productivity tool. In some embodiments, the resource activity feed may be intelligently populated by utilizing machine learning and artificial intelligence (AI) algorithms. Further, in some implementations, microapps may be configured within the cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, the systems of record 428 may represent the applications and/or other resources the resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 402, and in particular the data integration provider service 432, may, for example, support REST API, JSON, OData-JSON, and 6ML. As explained in more detail below, the data integration provider service 432 may also write back to the systems of record, for example, using OAuth2 or a service account.

In some embodiments, the microapp service 430 may be a single-tenant service responsible for creating the microapps. The microapp service 430 may send raw events, pulled from the systems of record 428, to the analytics service 438 for processing. The microapp service may, for example, periodically pull active data from the systems of record 428.

In some embodiments, the active data cache service 436 may be single-tenant and may store all configuration information and microapp data. It may, for example, utilize a per-tenant database encryption key and per-tenant database credentials.

In some embodiments, the credential wallet service 434 may store encrypted service credentials for the systems of record 428 and user OAuth2 tokens.

In some embodiments, the data integration provider service 432 may interact with the systems of record 428 to decrypt end-user credentials and write back actions to the systems of record 428 under the identity of the end-user. The write-back actions may, for example, utilize a user's actual account to ensure all actions performed are compliant with data policies of the application or other resource being interacted with.

In some embodiments, the analytics service 438 may process the raw events received from the microapps service 430 to create targeted scored notifications and send such notifications to the notification service 440.

Finally, in some embodiments, the notification service 440 may process any notifications it receives from the analytics service 438. In some implementations, the notification service 440 may store the notifications in a database to be later served in a notification feed. In other embodiments, the notification service 440 may additionally or alternatively send the notifications out immediately to the client 202 as a push notification to the user 426.

In some embodiments, a process for synchronizing with the systems of record 428 and generating notifications may operate as follows. The microapp service 430 may retrieve encrypted service account credentials for the systems of record 428 from the credential wallet service 434 and request a sync with the data integration provider service 432. The data integration provider service 432 may then decrypt the service account credentials and use those credentials to retrieve data from the systems of record 428. The data integration provider service 432 may then stream the retrieved data to the microapp service 430. The microapp service 430 may store the received systems of record data in the active data cache service 436 and also send raw events to the analytics service 438. The analytics service 438 may create targeted scored notifications and send such notifications to the notification service 440. The notification service 440 may store the notifications in a database to be later served in a notification feed and/or may send the notifications out immediately to the client 202 as a push notification to the user 426.

In some embodiments, a process for processing a user-initiated action via a microapp may operate as follows. The client 202 may receive data from the microapp service 430 (via the client interface service 416) to render information corresponding to the microapp. The microapp service 430 may receive data from the active data cache service 436 to support that rendering. The user 426 may invoke an action from the microapp, causing the resource access application 424 to send that action to the microapp service 430 (via the client interface service 416). The microapp service 430 may then retrieve from the credential wallet service 434 an encrypted Oauth2 token for the system of record for which the action is to be invoked, and may send the action to the data integration provider service 432 together with the encrypted Oath2 token. The data integration provider service 432 may then decrypt the Oath2 token and write the action to the appropriate system of record under the identity of the user 426. The data integration provider service 432 may then read back changed data from the written-to system of record and send that changed data to the microapp service 430. The microapp service 432 may then update the active data cache service 436 with the updated data and cause a message to be sent to the resource access application 424 (via the client interface service 416) notifying the user 426 that the action was successfully completed.

In some embodiments, in addition to or in lieu of the functionality described above, the resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 402 may, for example, parse these requests and respond because they are integrated with multiple systems on the back-end. In some embodiments, users may be able to interact with the virtual assistance through either the resource access application 424 or directly from another resource, such as Microsoft Teams. This feature may allow employees to work efficiently, stay organized, and deliver only the specific information they're looking for.

Referring to FIG. 5, according to some embodiments of the present disclosure, a network environment 500 can include one or more client devices 502 communicably coupled to one or more cloud services 504, a policy server 506, and one or more document editing services 508 via networks 510, 512, and 514, respectively.

Each network 510, 512, 514 may correspond one or more to wireless or wired computer networks including, but not limited to, local-area networks (LANs), metropolitan area networks (MANs), wide area networks (WANs), wireless local-area networks (WLAN), primary public networks, primary private networks, cellular networks, Wi-Fi (i.e., 802.11) networks, Bluetooth networks, and Near Field Communication (NFC) networks. In some embodiments, two or more of networks 510, 512, 514 may correspond to the same network or may share portions of a common network.

The network environment 500 may provide services for one or more organizations, with the organizations having one or more users associated with it. A given client device 502 may be assigned to or otherwise associated with a particular user. For example, as shown in FIG. 5, client device 502 may be assigned to, or associated with, user 516. While only one client device 502 and one corresponding user 516 are shown in FIG. 5, the structures and techniques sought to be protected herein can be applied to any number of organizations, users, and devices.

Client devices 502 can include smartphones, tablet computers, laptop computers, desktop computers, or other computing devices configured to run user applications (or "apps"). In some embodiments, a client device 502 may be substantially similar to a client machine 102 described above in the context of FIGS. 1 and 3, computing device 100 described above in the context of FIG. 2, and/or a client 202 described above in the context of FIGS. 4A-4C.

A client device 502 may have an associated "device profile" (also referred to herein as a "user profile") that identifies various information about a device, the user to whom the device is assigned, and/or the organization to which the device/user is associated. For example, a device profile may include device information such as manufacture, model name/number, hardware components and capabilities (e.g., processor speed, screen size, network interfaces, etc.), and a profile of the software installed on the device (e.g., operating system (OS) type and version, a list of apps and app versions installed on the device, etc.). As another example, a device profile can include user information such as the user's name, employee ID, office location, role/title with the organization, date of hire, security clearance, etc. As yet another example, a device profile can include information about the organization such as the type of business or other activity the organization is engaged, the industries or sectors the organization operates in, office locations, number of employees or other users associated with the organization, etc. As discussed in more detail below, device profiles may be used, in part, to provide restricted access to sensitive content.

Cloud services 504 can include, for example, Software-as-a-Service (SaaS) applications 504a and cloud storage systems 504b. A particular cloud service 504 may support many users associated with many different organizations. In some cloud services 504, organizations may correspond to a separate "tenant." An organization (i.e., users associated with the organization) may store and access various types of content within cloud services 504 including, for example, documents, spreadsheets, databases, web pages, databases, images, and videos. For example, referring to FIG. 5, an organization may upload a document 518 to cloud storage 504b and access the document 518 (or information therein) using SaaS application 504a. An organization can store and access sensitive content within cloud services 504. For example, a company may store (e.g., as an attachment) documents within a SaaS application 504a that include confidential information that, if divulged to unauthorized persons, would cause financial harm or regulatory compliance issues.

As used herein, "sensitive content" refers to any content that includes sensitive information, and "sensitive information" refers to any information that, if not guarded from unauthorized access and unwarranted disclosure, would undermine the information security of an individual or organization. Non-limiting examples of sensitive information include personally identifiable information (PII), protected health information (PHI), financial information for an individual/organization, and information deemed confidential by the individual/organization. Other examples of sensitive information can include contracts, sales quotes, customer contact information (e.g., email addresses), phone numbers, personal information about employees, employee compensation information, etc.

Policy server 506 can maintain policy and other configuration information related to the one or more organizations operating in the network environment 500 including security policies defined by the organizations for enforcement within the network environment 500. Via the policy server 506, an organization can define security policies related to users 516 and devices 502 associated with the organization. A security policy can determine the type of access that particular users/devices and/or groups of users/devices should be permitted with respect to the organization's applications and content. As one example, an organization may define a security policy that permits only certain users to view sensitive content. As another example, an organization may define a security policy that prevents users from viewing certain types of content from outside the organization's offices. As another example, an organization may define a security policy that allows users to access sensitive content using one SaaS application (e.g., an application the organization deems to be secure), while preventing users from accessing sensitive content from a different SaaS application (e.g., an application the organization deems to be insecure). A security policy targeting a particular user or group of users may be applicable to the device/devices assigned to the user/users. In some embodiments, an organization can define several classes of sensitive content, such as "not sensitive," "sensitive," and "highly sensitive" and define different security policies for different the different classes. As discussed in detail below, these and other types of security policies can be used to automatically restrict access to sensitive content accessed from cloud services and other types of network resources. In some embodiments, policy server 506 may identify which security policies are applicable for which users/devices and deliver applicable policy information to client devices 502 within the network environment. Additional features and embodiments of policy server 506 are described below in the context of FIG. 5 and further in the context of FIG. 9.

Cloud services 504 can include third-party applications and services that have their own security control and mechanisms which may not be co-extensive or compatible with the full range of security policies that an organization may desire and/or define via policy server 506. For example, a given SaaS application 504a may allow an organization to grant/restrict access to certain features and content for specific users or groups of users, it may not provide any mechanism for restricting access to content based on the user's location when accessing the content. As another example, while a third-party cloud storage service 504b may provide controls for restricting access to entire documents or other content, it may not provide the ability for a user to provide access to non-sensitive portions of a document while hiding sensitive information from the user. Moreover, cloud services 504 may not have the ability to automatically detect and hide sensitive content, meaning that an organization's security or compliance team may have to manually configure security controls for individual documents, folders, etc.

As a solution to the aforementioned and other technical problems, in some embodiments, client device 502 may be configured to automatically detect when a user is accessing content from cloud services 504 or other network resources, to determine if the content is sensitive, and, depending on the organization's security policy, to automatically redact/remove sensitive information before allow the user to view or otherwise access the content. Various types of access to content can be restricted using the structures and techniques disclosed, including a user uploading, downloading, copying, pasting, viewing, or sharing content.

For example, if user 516 accesses a web page generated by SaaS application 504*a*, client device 502 may automatically identify sensitive information within the web page content (including text and images) and generate a modified web page wherein the sensitive information is redacted or removed. In this example, document 518 shown in FIG. 5 may represent the original or unmodified web page and document 520 may represent the modified web page. Client device 502 may display the modified web page 520 while preventing the user from viewing or otherwise accessing the content of the original/unmodified web page 518.

As another example, if user 516 attempts to upload a document having sensitive information to cloud storage 504*b*, client device 502 may automatically remove/redact sensitive information from the document before it is transmitted to the cloud storage 504*b*. In this example, document 520 shown in FIG. 5 may represent the original/unmodified document and document 518 may represent the modified document. Thus, embodiments of the present disclosure can be used to protect an organization and its users by preventing sensitive content from being uploaded to one or more cloud services 504 (e.g., to specific cloud services that the organization has deemed to be insecure).

In some embodiments, client device 502 may automatically detect when a user is about to upload sensitive content to a given cloud service 504 or other network resource. In this case, client device 502 may notify or warn a user if the user and/or require them to acknowledge the potential risk of uploading sensitive content to a given cloud service 504. Subsequently, if the same user or a different user within the organization attempts to access the content from the cloud service, that accessing user's client device 502 can automatically identify and remove/redact the sensitive information based on the organization's security policy and the context in which the access is occurring.

In response to detecting that a user is accessing sensitive content, client device 502 can take various actions (or no action) depending on applicable security policy and the context in which the access is occurring. Here, "context" can refer to one or more factors such as the type of access the user is attempting (e.g., downloading vs. viewing vs. sharing), the particular cloud service or other network resource the content is being accessed from (e.g., the name or type of SaaS or web application being accessed), the type of content being accessed, other metadata associated with the content, the location of the device from which the access is occurring, the time or day of week when access is occurring, whether the device is secure (e.g., whether the device has passed one or more security checks), the type of network connection over which the access is occurring (e.g., a VPN or other private/secure connection vs. a public/insecure connection). Depending on the applicable security policy and the context of the access, client device 502 can, for example, allow the user to access sensitive content without modification, allow the user to access a modified version of the content in which sensitive information has been removed/redacted, or prevent the user from accessing the content altogether.

In some embodiments, user 516 may access cloud services 504 and other network resources using a dedicated app 502*a* installed on client device 502. The app 502*a*, referred to herein as the "secure access app," may provide a single-entry point for user 516 to access the organization's resources, such as files, applications, desktops, web sites, etc. In one example, the secure access app 502*a* may be the CITRIX WORKSPACE app. The secure access app 502*a* may include a web browser for accessing web-based SaaS applications 504*a* along with other types of web apps and websites. The secure access app 502*a* may automatically restrict access to sensitive content located within cloud services 504 and other network resources using the concepts and techniques disclosed herein.

In some embodiments, app 502*a* may include a machine-learning (ML) engine configured to classify content as sensitive or not sensitive using one or more trained ML models. The ML models may be delivered to the client device 502 via policy server 506 or other server within the network environment 500. The trained ML models delivered to a particular client device 502 may be selected based on the device profile including information about the organization the device is assigned to, such as the size of the organization, the type of business or other activity the organization is engaged, the industries or sectors the organization operates in, etc.

Policy server 506 may maintain a database of domain-specific models that are trained using representative datasets for particular domains. As used herein, "domain" can refer to any attribute or set of attributes associated with an organization. For example, policy server 506 can maintain one set of trained models for large organizations (e.g., organization having more than a threshold number of users associated with it) and a different set of trained models for small organizations. As another example, policy server 506 can maintain one set of trained models for organizations associated with the healthcare sector and a different set of trained models for organizations associated with the finance sector. Within network environment 500, a given domain-specific model can be relevant to a single organization or multiple organizations (or, for completeness, to no organization).

In some cases, policy server 506 may select multiple trained models to be delivered to a given client device 502. For example, for a given domain, policy 560 server may store one model trained for detecting sensitive text-based content and a different model trained for detecting sensitive image-based content. In this case, policy server 506 may deliver both models to the client device 502 and the client device 502 can select the appropriate model for given content based on the context in which that content is being accessed (e.g., based on the type of content being accessed). In some embodiments, policy server 506 may periodically push new or updated ML models to client devices 502. In some embodiments, client devices 502 may send analytics related to the usage of the ML models to the policy server 506 or a separate analytics server (not shown).

In some embodiments, client device 502 (or, more particularly, secure access app 502*a*) may use one or more document editing services 508 to remove/redact sensitive information from documents or other content. A given document editing service 508 may provide an application programming interface (API) for creating and modifying documents in one or more formats, such as PDF, XLSX, DOCX, TXT, RTF, CSV, PNG, GIF, JPEG, or other text-based or image-based formats. Thus, in some embodiments, client device 502 may identify one or more portions of a document having sensitive information, send one or more requests to an API associated with a document editing service 508 capable of modifying the document in compliance with the organization's security policy, and, in response, provide the user with access to the modified document (e.g., a version of the document having the sensitive information removed or redacted). In other embodiments, client device 502 (or, more particularly, secure access app 502a) may include or otherwise have access to software libraries for modifying documents of various formats. As one example, a library included within the app 502a may provide a means for iterating through a PDF document by name-value pairs and/or as form fields, and for editing particular values or form fields within the PDF document. As another example, client device 502 may include image processing software that can be used to analyze image content using optical character recognition (OCR) or other computer vision (CV) techniques, and to manipulate various types of image data and image file formats.

Figure 6:
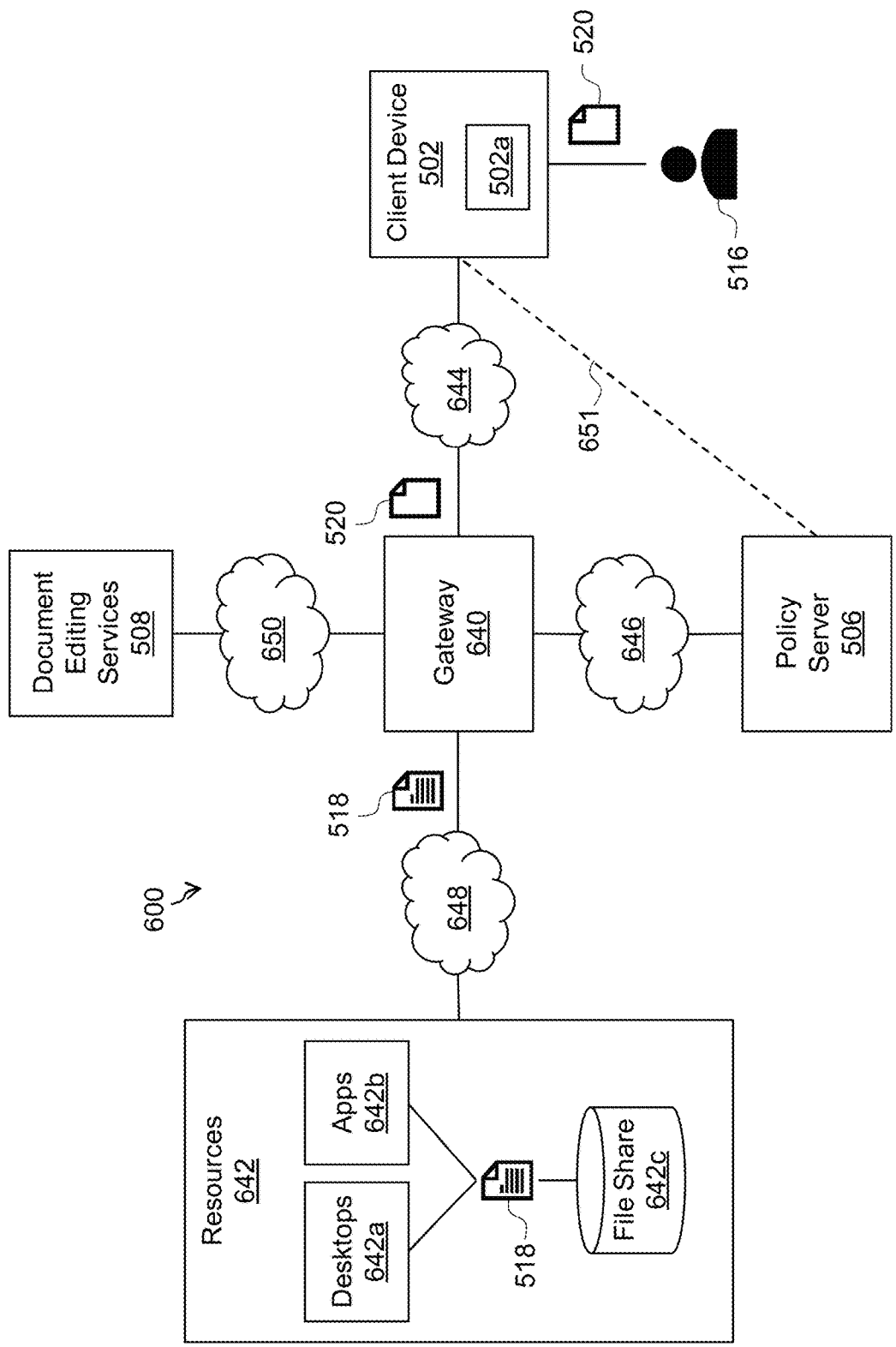
FIG. 6 is a block diagram of an illustrative network environment in which a gateway device can restrict access to sensitive content, according to an embodiment of the present disclosure.

Turning to FIG. 6, in which like elements of FIG. 5 are shown using like reference designators, an illustrative network environment 600 can include one or more client devices 502, a gateway device 640, policy server 506, one or more document editing services 508, cloud services 504, and one or more network resources 642, according to embodiments of the present disclosure.

The gateway device (or "gateway") 640 may be communicably coupled to client devices 502, policy server 506, network resources 642, and document editing services 508 via networks 644, 646, 648, and 650, respectively. Each network 608, 610, 612, 614 may correspond one or more to wireless or wired computer networks including, but not limited to, local-area networks (LANs), metropolitan area networks (MANs), wide area networks (WANs), wireless local-area networks (WLAN), primary public networks, primary private networks, cellular networks, Wi-Fi (i.e., 802.11) networks, Bluetooth networks, and Near Field Communication (NFC) networks. In some embodiments, two or more of the networks 608, 610, 612, 614 may correspond to the same network or may share portions of a common network. In some embodiments, client devices 502 may also be communicably coupled to policy server 506, as indicated by dashed line 651 in FIG. 6.

A client device 502 can be configured to access network resources 642 via gateway 640. That is, communication between client device 502 and network resources 642 may be routed through gateway 640. In some embodiments, gateway 640 may be substantially similar to appliance 108 described above in the context of FIG. 1 and/or gateway service 408 described above in the context of FIGS. 4A and 4B. Network resources 642 can include, for example, remote desktops 642a, remote applications 642b, and network storage (or "file shares") 642c. In some embodiments, network resources 642 can include on-premises (or "on-prem") resources. In some embodiments, network resources 642 can include virtual app and desktop sessions. In some embodiments, network resources 642 can include cloud services or resources, such as cloud services 504 described above in the context of FIG. 5. It should be noted however that, whereas in the embodiment of FIG. 5 client devices 502 are shown directly accessing cloud services 504, in the embodiment of FIG. 6 client devices may be configured to access cloud services and other resources via the gateway 640. In some embodiments, gateway 640 may be co-located with network resources 642 (e.g., gateway 640 may be an on-prem server or device). In some embodiments, some or all of the functionality and structure described herein the context of policy server 506 may be integrated/implemented within the gateway 640. That is, policy server 506 and gateway device 640 may be provided using common hardware and/or software.

Network resources 642 can include third-party applications and services that have their own security control and mechanisms which may not be co-extensive or compatible with the full range of security policies that an organization may desire and/or define via policy server 506. Moreover, network resources 642 may not have the ability to automatically detect and hide sensitive content, meaning that an organization's security or compliance team may have to manually configure security controls for individual documents, folders, etc. As a solution to these and other technical problems, in some embodiments, gateway device 640 may be configured to automatically detect when a user is accessing content from network resources 642, to identify any sensitive information within the content, and, depending on the organization's security policy, to automatically redact/remove the sensitive information before allow the user to view or otherwise access the content. For example, if user 516 accesses a sensitive document 518 via remote desktop 542a, gateway 640 may automatically identify sensitive information within the document, generate a modified version of the document 520, and provide the user with access to the modified document 520.

Gateway device 640 may detect sensitive content and take action in response to detecting sensitive content using the same or similar techniques described above as being performed by client device 502 in the context of FIG. 5. For example, gateway device 640 may include a ML engine configured to detect sensitive content and it may receive domains-specific trained ML models from policy server 506. As another example, gateway device 640 may use document editing services 508 to remove/redact sensitive information from documents and other content and/or gateway device 640 may include libraries for modify various types of content.

In some embodiments, embodiments shown and described in the context of FIG. 6 may be combined with embodiments shown and described in the context of FIG. 5. For example, a network environment may include a gateway configured to restrict access to sensitive content in on-prem desktops/app (as in FIG. 6) and may also include client devices configured to restrict access to sensitive content in SaaS applications (as in FIG. 5).

Figure 7:
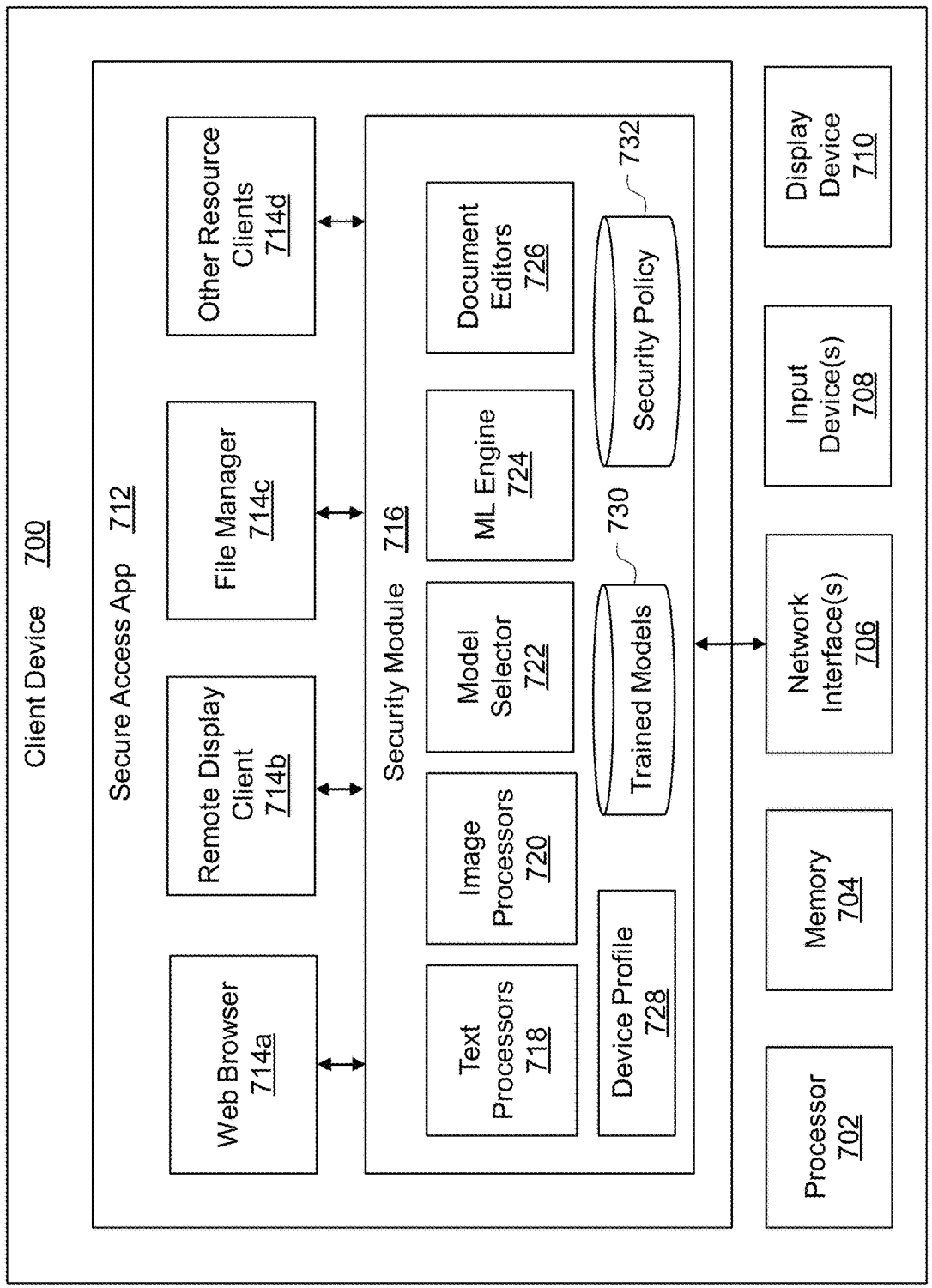
FIG. 7 is a block diagram of an illustrative client device that may be used within the network environment of FIG. 5 and/or FIG. 6, according to an embodiment of the present disclosure.

FIG. 7 shows an illustrative client device 700 that may be used within the network environment of FIG. 5 and/or FIG. 6, according to an embodiment of the present disclosure. For example, client device 700 may be the same as or similar to client device 502 shown in FIGS. 5 and 6 and described above in the context thereof.

Client device 700 can include a processor 702, memory 704, one or more network interfaces 706, one or more input devices 708, and a display device 710. A secure access app 712 may be installed on the client device 700 (e.g., stored within memory 704) and executable by processor 702. Secure access app 712 may be configured to use the one or more network interfaces 706 to send and receive content to cloud services and other network resources. Network interfaces 706 can include, for example, one or more of a Wi-Fi interface, a cellular network interface, an Ethernet interface, and/or a Bluetooth interface. Secure access app 712 can receive input from a user via input devices 708 and display content to the user via display device 710. Input devices 708 can include, for example, one or more of a touchscreen device, a keyboard, a mouse, and other types of input devices. Display device 710 can include, for example, a touchscreen display or a monitor.

Secure access app 712 can include or otherwise have access to one or more client apps 714a, 714b, 714c, etc. (714 generally) configured to access cloud services and other network resources. For example, as shown in FIG. 7, secure access app 712 can include a web browser 714a for access with SaaS applications and other web-based apps or web sites, a remote display client 714 for accessing remote desktops and applications, a file manager 714c for accessing cloud storage or network file shares, and other network resource clients 714d. In some embodiments, remote display client 714 can include an HDX, ICA, RDP, or VNC client.

Secure access app 712 can include a security module 716 configured to restrict access to sensitive content accessed via the one or more client apps 714 according to an organization's security policy. Thus, for example, security module 716 may be physically or logically coupled between client apps 712 and network interfaces 706 such that the security module 716 can intercept or detect requests to access content sent from client apps 712 to cloud services and other network resources, and can intercept/detect responses sent from cloud services and other network resources to client apps 712. As used herein, the term "module" refers to a collection of hardware and/or software configured to perform and execute the processes, steps, or other functionality described in conjunction therewith. In some embodiments, security module 716 (or portions thereof) may be implemented as a plugin-in for web browser 714a. In some embodiments, security module 716 may be a library compiled into or dynamically loaded into client apps 714 and configured to intercept networking system calls. In some embodiments, security module 716 may detect when the user performs (or attempts to perform) certain actions within the client apps 714, such as uploading content, downloading content, sharing content, or copying/pasting content. In response to detecting such an action, security module 716 may identify and remove/redact sensitive information in the content being acted upon. Security module 716 can continually monitor user behavior and actions on the client device 700 to enforce an organization's security policy with respect to sensitive information.

The illustrative security module 716 can include one or more text processors 718, one or more image processors 720, a model selector 722, a machine learning (ML) engine 724, and one or more document editors 726. Security module 716 may store or otherwise have access to a device profile 728, one or more trained models 730, and security policy 732 applicable to the device 700. As discussed above in the context of FIG. 5, trained models 730 and applicable security policy 732 may be delivered to the client device 700 via a policy server (e.g., policy server 506).

Text processors 718 can include software and/or hardware configured to analyze documents and other text-based content and transform raw or unstructured text into a structured format suitable for use by the ML engine 724. As used herein, "text-based content" refers to any content that primarily includes text. Examples of text-based content include documents, spreadsheets, databases, web pages, and databases. In some embodiments, a text processor 718 may identify text using a technique such as Term Frequency-Inverse Document Frequency (TF-IDF) to transform text into a vector representation usable by ML engine 724 to classify content as sensitive or not sensitive. A detailed discussion of techniques for generating vector representations of text (so-called "feature extraction" techniques) is provided below in the context of FIGS. 10 and 11. In some embodiments, text processors 718 can include libraries for extracting/parsing text from various document formats.

In some embodiments, a text processor 718 may filter out certain words when generating vector representations of text content. For example, a text processor 718 may filter out "stop-words." As used herein, the term "stop-words" refers to words that are commonly used and that do not, in general, convey contextual information relevant to detecting sensitive content. For example, words such as "and," "the," and "him" may be included in a list of stop-words. A list of stop-words may be delivered to client device 700 by a policy server or other server within a network environment. In some embodiments, the policy server may select a list of stop-words for a given client device 700 in a domain-specific manner. For example, policy server may maintain separate lists of stop-words for different locales, and select a relevant list of stop-words for a given client based on the country or region where that client's organization is based.

In some embodiments, a text processor 718 may perform semantic analysis of text-based content to detect sensitive information such as PI. For example, text processor 718 may use regular expressions to identify pattern of characters such as telephone numbers, social security numbers, email addresses, mailing addresses, etc. Other patter recognition techniques may be used to identify sensitive text.

Image processors 720 can include software and/or hardware configured to analyze image-based content and to extract structured data from the image-based content that can be used by the ML engine 724 to detect sensitive information. As used herein, "image-based" content refers to content other than text-based content. Examples of image-based content include drawings, designs, photographs, graphics, animations, and videos. In some embodiments, an image processor 720 may extract text from image content using Optical Character Recognition (OCR) or another computer vision (CV) technique. Image processing libraries that can be used for extracting text from images include opencv and pytesseract. The extracted text can then be provided as input to one or more of the text processors 718 and transformed into vector representations as previously discussed.

It is appreciated herein that images can include sensitive information that is not represented as text. Examples include product designs, architectural designs, employee photographs, etc. In this case, client device 700 may select a ML model trained to detect images that include sensitive information. Techniques for identifying sensitive images are discussed further below.

Model selector 722 may be configured to select, from the one or more trained models 730, a model or models suitable for detecting sensitive content being accessed in a particular context. As mentioned previously, a policy server can deliver multiple domain-specific trained models 730 to a client device. Stated different, models 730 may include the set of trained models that may be relevant for use in several different contexts and not all models may be appropriate for use in a particular context. Model selector 722 may select an appropriate model for a given context based on factors such as the type of access the user is attempting, the particular cloud service or other network resource from which the content is being accessed, the type of content being accessed (e.g., image-based content vs. text-based content), other metadata associated with the content, the time/day when the access is occurring, the type of network connection over which the access is occurring, etc. Model selector 722 can use these and other factors to select a suitable model from the set of available trained models 730 for use in classifying a given document or other content as sensitive or not sensitive.

In some embodiments, model selector 722 may select one or more models from the set of available models 730 based on known performance characteristics (which may be statically configured or learned) of various ML algorithms and techniques. For example, logistic regression (LR) and support vector machine (SVM, e.g., SVM with linear kernel) may perform similar in many contexts, however LR can be more sensitive to input that includes outliners when compared to SVM. On the other hand, SVM may perform better in certain contexts because it can find a decision boundary with maximum margin during classification. A neural network (NN) may perform well certain contexts due to its ability to learn complex patterns which cannot be represented using a linear function, however NN models may more computational expensive (e.g., during training). Techniques for evaluating the performance of ML models are described in detail below in the context of the policy server of FIG. 9. Such techniques may also be utilized within a client device 700 and, more particularly, within model selector 722 and/or ML engine 724.

ML engine 724 may use the trained model (or models) selected by model selector 722 and the structured representation generated by text processors 718 and/or image processors 720 to detect sensitive content. ML engine 724 may include hardware and/or software configured to perform one or more ML techniques such as LR, SVM, and/or NN techniques. As output, ML engine 724 may classify the content or portions thereof as sensitive or not sensitive. In the case of text-based content, ML engine 724 may classify particular words, sentences, lines, paragraphs, or other groupings of text as sensitive or not sensitive. In the case of image-based content, ML engine 724 may classify particular regions of the image (e.g., regions defined by geometric coordinates and/or dimensions) as sensitive or not sensitive. In some embodiments, ML engine may output a classification having three or more possible states/values (e.g., "highly sensitive," "sensitive," or "not sensitive").

In some embodiments, ML engine 724 may be provided as library that can be executed within one or more of the client apps 714. In some embodiments, ML engine 724 may be provided as a JavaScript library, such as TensorFlow.js, that can be executed within web browser 714*a*. In this case, trained models 730 may be provided as data objects in a format such as JavaScript Object Notation (JSON). One or more of the text processors 718, image processors 720, and model selector 722 may also be implemented as JavaScript executable within web browser 714*a*.

Document editors 726 can be configured to modify various types of documents and other content to remove/redact sensitive information. Document editors 726 can include libraries for modifying various document formats, such as PDF, XLSX, DOCX, TXT, RTF, CSV, PNG, GIF, JPEG, or other text-based or image-based formats. In some embodiments, client device 700 may use one or more external document editing services (such as document editing services 508 described above in the context of FIG. 5). Security module 716 may use the output of text processors 718, image processors 720, and/or ML engine 724 to determine if content includes sensitive information and, in response, may invoke one or more document editors 726 to remove/redact that information before the content is displayed or otherwise made accessible the user. As one example, a document editor 726 may be provided as a library configured to iterate through a PDF document by name-value pairs and/or as form fields, and for editing particular values or form fields within the PDF document. As another example, a document editor 726 may include an image processing library operable to modify various types of image data and image file formats. As discussed previously, the way in which sensitive content is modified (if at all) may be determined based on the context in which the content is being accessed and the applicable security policy 723.

In some embodiments, client device 700 may include one or more controls that allow a user to temporarily disable the removal/redaction of sensitive content. In other words, a user may have the option to reveal or "unmask" sensitive content in certain situations. The availability of such controls may be based on the organization's security policy 732 applicable to the user/device. In some embodiments, client device 700 may alert the user (e.g., by displaying a message or other indicator) when the user is downloading or otherwise accessing sensitive content and/or when sensitive content has been modified prior to it being displayed to the user. In some embodiments, client device 700 may provide the user with additional information explaining why content was modified, such as notifying the user that they are accessing the content from an insecure location, from an insecure device, over an insecure network connection, etc.

Figure 8:
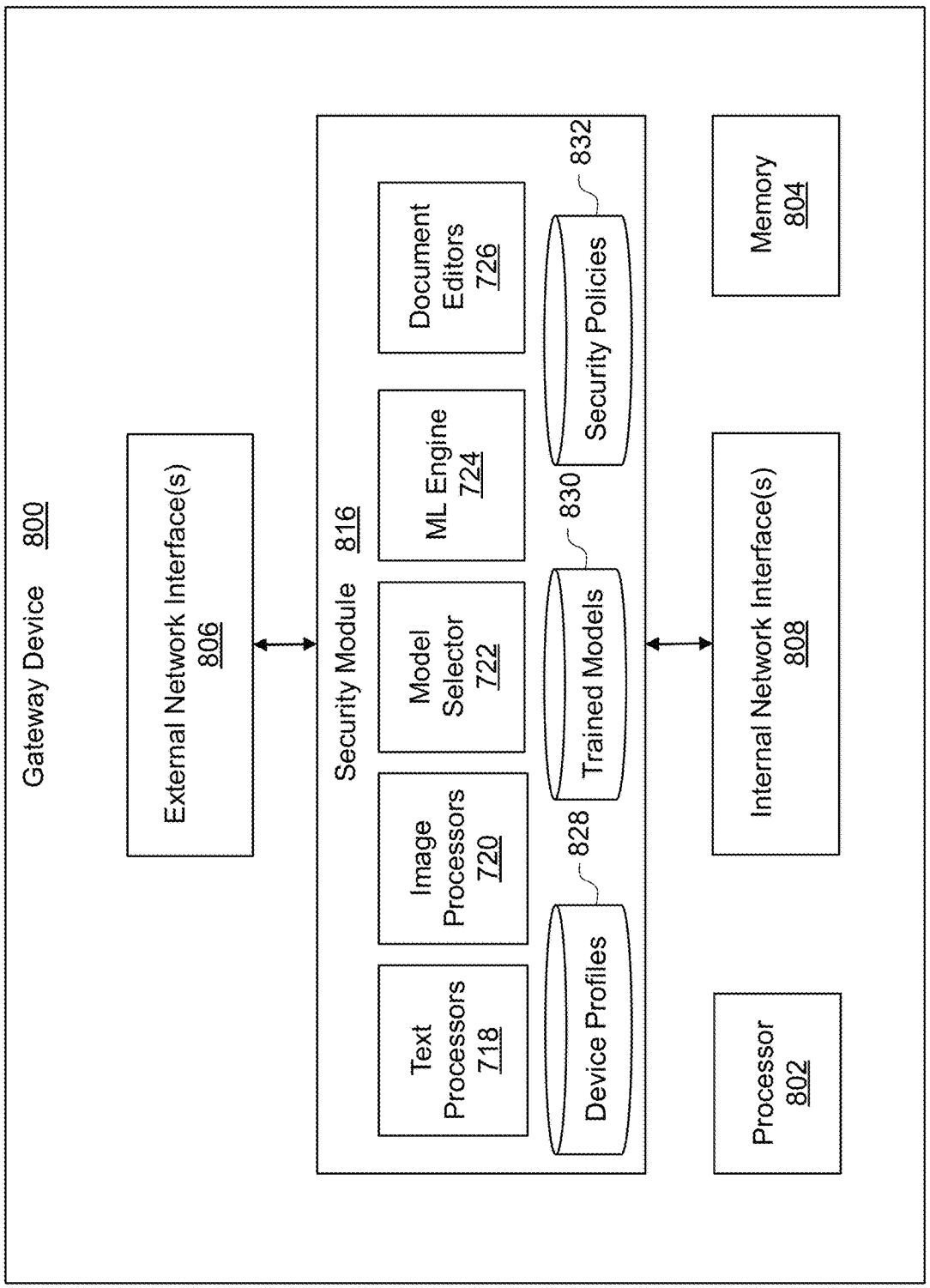
FIG. 8 is a block diagram of an illustrative gateway device that may be used within the network environment of FIG. 6, according to an embodiment of the present disclosure.

Turning to FIG. 8, in which like elements of FIG. 7 are shown using like reference designators, a gateway device 800 can include a processor 802, memory 804, one or more external network interfaces 806, and one or more internal network interfaces 808, according to an embodiment of the present disclosure. The illustrative gateway device 800 can be used within the network environment of FIG. 6. For example, gateway device 800 may be the same as or similar to gateway device 640 shown in FIG. 6 and described above in the context thereof.

External network interfaces 806 may include one or more network interfaces configured to communicate with client devices over public networks (e.g., the public Internet). Internal network interfaces 808 can include one or more network interfaces configured to communicate with network resources that are on a private/secured network (e.g., the organization's on-prem network). For example, referring to both FIGS. 6 and 8, external network interfaces 806 may be configured to communicate over network 644 (e.g., a public network) whereas internal network interfaces 808 may be configured to communicate over network 648 (e.g., a private network). Gateway device 800 may be configured to monitor and restrict network traffic into and out of an organization's private network (e.g., on-premises network).

A security module 816 may be installed on the gateway device 800 (e.g., stored within memory 804) and executable by processor 802. Security module 816 may be physically or logically positioned between the external network interfaces 806 and the internal network interfaces 808 so that the security module 816 can intercept or detect requests/response to access content between client devices and network resources and vice-versa. Security module 816 may be similar to previously described security module 716 (FIG. 7) in terms of structure and functionality. For example, security module 816 automatically identifies and redacts/removes sensitive content in accordance with the organization's applicable security policy.

A few differences between security module 816 (FIG. 8) and security module 716 (FIG. 7) are noted. Whereas security module 716 (FIG. 7) includes a single device profile 728 describing attributes of the client device 700 on which it is installed, security module 816 (FIG. 8) may store or otherwise have access to multiple device profiles 828 corresponding to the client devices that can utilize gateway device 800 (e.g., all device profiles for a particular organization). In addition, security module 816 (FIG. 8) may store or otherwise have access to the full set of trained models 830 associated with or relevant to an organization, whereas security module 716 (FIG. 7) may store only trained models 730 associated with or relevant to the client device on which it is installed. Furthermore, security module 816 (FIG. 8) may store or otherwise have access to the full set of security policies 832 associated with or relevant to an organization, whereas security module 716 (FIG. 7) may store only security policies 732 associated with or relevant to the client device on which it is installed. When a client device accesses a network resource via the gateway device 800, security module 816 may select, from among the multiple profiles 828, a particular device profile associated with that client device. Similarly, security module 816 may select one or more trained models relevant to the client device from the organization's full set of trained models 830 and may select security policy relevant to the client device from the organization's full set of security policies 832. Security module 816 can use the selected device profile, trained models, and security policy to identify and modify sensitive content being accessed by the particular client device using techniques substantially similar to those described above for security module 716 (FIG. 7).

Figure 9:
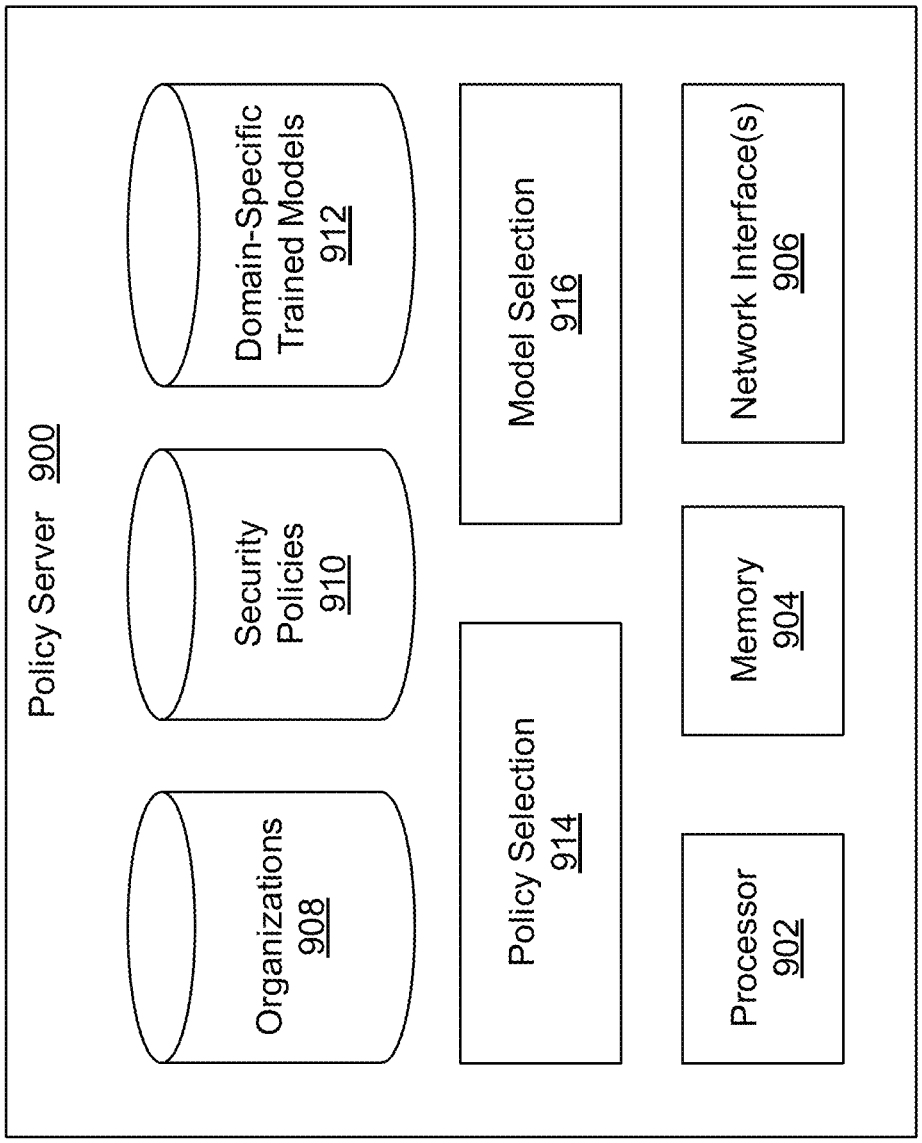
FIG. 9 is a block diagram of an illustrative policy server that may be used within the network environment of FIG. 5 and/or FIG. 6, according to an embodiment of the present disclosure.

FIG. 9 shows an illustrative policy server 900 that may be used within the network environment of FIG. 5 and/or FIG. 6, according to an embodiment of the present disclosure. For example, policy server 900 may be the same as or similar to policy server 506 shown in FIGS. 5 and 6 and described above in the context thereof.

Policy server 900 can include a processor 902, memory 904, and one or more network interfaces 906. Network interfaces 906 may be configured for communication with client devices (e.g., client devices 502 in FIG. 5) and/or with a gateway device (e.g., gateway device 640 in FIG. 6). Policy server may include or otherwise have access to an organizations database 908, a security policies database 910, and domain-specific trained models 912.

Within organizations database 908, policy server 900 can maintain information about one or more organizations operating in a network environment, for example, the list of users and devices associated with the organization, the size of the organization (e.g., number of users associated with the organization), the type or nature of business or other activity the organization is engaged, the industries or sectors the organization operates in, and other attributes related to the organization.

Within security policies database 910, policy server 900 can maintain information regarding security policies defined by one or more organizations for enforcement within the network environment. A given security policy can determine the type of access that particular user/device, or a group of users/devices, has with respect to the organization's content, applications, and other resources.

Domain-specific trained models 912 can include ML models trained using representative datasets for particular domains. For example, policy server 900 can maintain one trained model for large organizations (e.g., organization having more than a threshold number of users associated with it) and a different trained model for small organizations. As another example, policy server can maintain different models for companies in the health care, financial, and infrastructure sectors. In some embodiments, an organization's attributes, stored within database 908, may be used to determine which domain-specific models are relevant for the organization. As discussed previously, a given domain-specific model can, in some cases, apply to a single organization or to many organizations.

Policy server 900 may include a policy selection module 914 configured to select, from database 910, one or more security policies that are applicable to a given user or client device. Using policy selection module 914, policy server 900 may determine appropriate policy information to push/deliver to a particular client device or gateway device for use in identifying sensitive content and/or determining what action to take in response to identifying sensitive content. A security policy may be targeted at a particular user/device or to a group of users/devices. In some embodiments, policy server 900 may periodically push new or updated security policy to client devices and/or gateway devices.

Policy server 900 may include a model selection module 916 configured to select, from among the domain-specific trained models 912, one or more trained models relevant for a given user or device. Using model selection module 916, policy server 900 may determine appropriate policy information to push/deliver to a particular client or gateway device for use in identifying sensitive content. Model selection model 916 may use several factors to select appropriate models, including but not limited to the device profile, the security policy defined for the organization, and attributes configured for the organization that can be used to determine the domain or domains in which it operates. In some embodiments, policy server 900 may periodically push new or updated trained models to client devices and/or gateway devices.

Domain-specific trained models 912 can include trained models according to one or more different ML algorithms or techniques, including LR models, SVM models, and/or NN models. These ML techniques may have tradeoffs, as previously discussed, and model selection module 916 can use information about these tradeoffs to decide which models to deliver to a given client device or gateway device.

Policy server may evaluate the performance of domain-specific trained models 912 using various metrics and, based on these metrics, can determine which models to deliver to specific client devices and/or gateway devices. Various metrics are available for model evaluation and a particular metric or set of metrics can be used to fine tune the model according to the needs of groups of organizations (i.e., organizations within the same domain) or individual organizations. Such metrics can be calculated using a validation dataset that is independent of the training dataset.

In some embodiments, policy server may select a trained model 912 based an accuracy metric. This metric may be particularly useful if both the training dataset and the validation dataset are class-balanced, meaning that the number of sensitive documents (or other content) within the dataset is approximately equal to the number of non-sensitive documents in the dataset. Accuracy may be calculated as the number of correct predictions divided by the total number of predictions or, in more detail as:

$$\text{Accuracy} = \frac{TP + TN}{TP + TN + FP + FN}$$

where TP=True Positives, TN=True Negatives, FP=False Positives, and FN=False Negatives.

If either the training dataset or validation dataset is not class-balanced (i.e., it is imbalanced), techniques such as undersampling and oversampling can be used to balance the dataset prior to calculating a metric such as accuracy. It is appreciated herein that using a balanced training dataset and/or a balanced validation dataset may be important for determining the performance of a dataset using the accuracy metric.

If it is determined that the training and/or validation dataset is not balanced, alternative metrics such as a so-called "F1 score" (which itself is based on precision and recall metrics) may be instead used to evaluate the performance of a model:

$$\text{Precision} = \frac{TP}{TP+FP}$$

$$\text{Recall} = \frac{TP}{TP+FP}$$

$$F1 = \frac{2 \times \text{precision} \times \text{recall}}{\text{precision} + \text{recall}}$$

In some embodiments, one or more of the models 912 can be trained in an iterative fashion until a suitably high F1 score is reached (e.g., by comparing the calculated F1 score against a predetermined threshold). Using this approach, policy server 900 can ensure a sufficiently small rate of both false positives and false negatives. In some embodiments, an organization can define a minimum rate of false positives and/or false positives they seek to achieve, and policy server 900 may use this information to train and/or select models 912 delivered to users/devices for that organization. In the case where an organization has defined a minimum false positive rate, policy server 900 may select an existing model (or train a new model) that achieves a desirable (and ideally achieves a maximum) precision metric. In the case where an organization has defined a minimum false negative rate, policy server 900 may select an existing model (or train a new model) that achieves a desirable (and ideally achieves a maximum) recall metric.

In some embodiments, policy server 900 can improve (and ideally optimize) the performance of one or more trained models 912 using an optimization technique or algorithm such as Gradient Descent, Conjugate Gradient, Broyden-Fletcher-Goldfarb-Shanno (BFGS), or L-BFGS. Such optimization techniques may evaluate a multivariate cost function for different combinations of model parameters to find a set of parameter values that minimize the cost function. A cost function (or "loss function") is a function used to calculate a numerical cost of a model output being inaccurate (e.g., the cost of a misclassification).

In some embodiments, policy server 900 can train one or more of the models 912 using a two-step process. First, the models can be trained using a labeled dataset. Second, the models can be further trained using an unsupervised learning technique such as Expectation-Maximization Iterative Clustering.

In some embodiments, the aforementioned ML training and optimization techniques may be performed by a system, service, or device external to the policy server 900.

In some embodiments, policy server 900 can maintain domain-specific lists of stop-words and deliver relevant lists of stop-words to client devices and/or gateway devices for use in detecting sensitive text-based content. In one example, policy server 900 may maintain a default list of stop-words, such as a list provided by the scikit-learn Python library.

Figure 10:
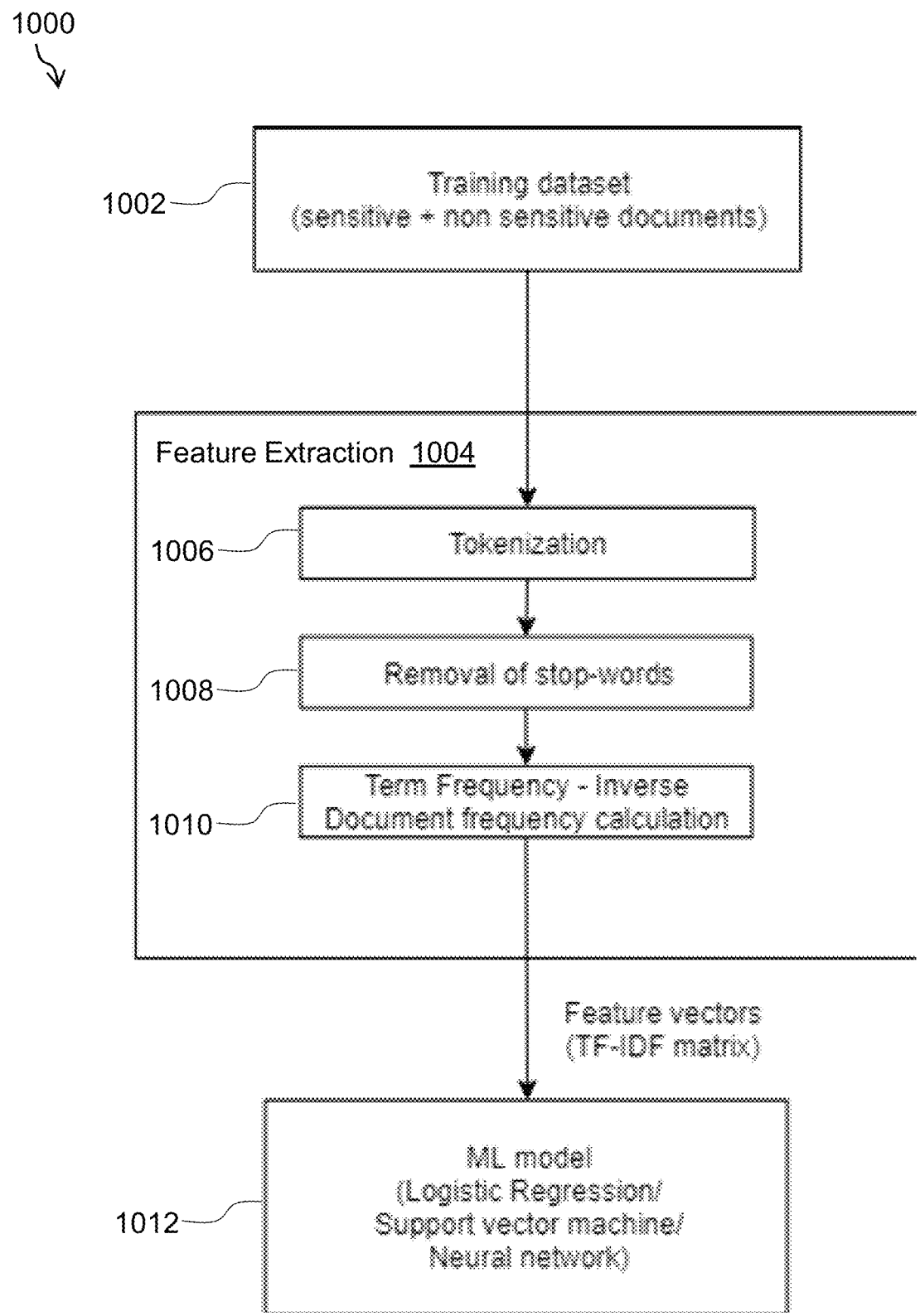
FIG. 10 is a flow diagram of an illustrative process for training a machine learning (ML) models, according to an embodiment of the present disclosure.

FIG. 10 shows an illustrative process 1000 for training a model to detect sensitive content and, more particularly, sensitive text-based content, according to an embodiment of the present disclosure. Process 1000 can be implemented or used within a network environment such as environment 500 of FIG. 5 and/or environment 600 of FIG. 6. Although the following description of process 1000 may refer to documents, it is appreciated herein that the process can be applied to other types of text-based content. Process 1000 may be used to train a model for a particular domain of organizations and/or for an individual organization.

At block 1002, a training dataset may be received. The training dataset may include one or more sensitive documents and one or more non-sensitive documents. In some embodiments, the training dataset may include approximately the same number of sensitive and non-sensitive documents (i.e., the training dataset may be balanced). The training dataset may be labeled to indicate which documents are sensitive and which are non-sensitive. In some embodiments, more than two sensitive classifications can be used—e.g., "highly sensitive," "sensitive," and "not sensitive"—and the training dataset may include documents from more than one class and be labeled accordingly.

At block 1004, the documents within the training dataset may be pre-processed (or "vectorized") to transform the raw/unstructured text within the documents into a structured format suitable for training the ML model. This may be referred to as "feature extraction." In particular, for the documents within the training dataset, a corresponding feature vector may be generated. In some embodiments, Term Frequency-Inverse Document Frequency (TF-IDF) may be used to generate the feature vectors, as discussed next in the context of blocks 1006, 1008, and 1010. In some embodiments, the TfidfVectorizer class within the scikit-learn library may be used to implement some or all of the processing shown in blocks 1006, 1008, 1010.

At block 1006, for individual documents in the training dataset, text from the documents can be extracted using a document reader/parser selected based on the document type or other metadata associated with the document. The extracted text can be separated into one or more tokens (or "terms"). In some embodiments, the TfidfVectorizer class may be used to identify tokens in the input text. In some embodiments, a regular expression may be used to tokenize documents (e.g., "[a-zA-Z][a-zA-Z]{2,}").

At block 1008, the tokens may be filtered to remove stop-words. As discussed previously, one or more lists of stop-words may be defined and a domain-specific stop-word lists may be used. Block 1008 can include filtering the listed stop-words from the tokens produced for documents within the training dataset.

At block 1010, for individual documents in the training dataset, a TF-IDF calculation may be performed using the filtered tokens produced for the document. Term frequency (TF) refers the frequency of a particular token within a single document. Document frequency (DF) refers to the number of documents within the training dataset in which a given token appears. A TF-IDF vector generated using TF and DF can denote how important particular words in the context of the training dataset.

In some embodiments, calculated DF values may be used to determine which tokens to include in a generated TF-IDF vector. For example, tokens having a calculated DF value less than a minimum DF threshold value may be excluded from the TF-IDF vector. Likewise, tokens having a calculated DF value greater than a maximum DF threshold value may be excluded from the TF-IDF vector. In some embodiments, the minimum DF threshold value may be predetermined constant value (e.g., a value between 5 and 10). In some embodiments, the maximum DF threshold value may be variable and, for example, calculated based on the size of a given training dataset. The minimum and maximum DF threshold values may be determined empirically and/or in a domain-specific manner. It is appreciated herein that applying an upper limit can reduce the processing time/resources needed to train a model and/or use a trained model to detect sensitive information. In particular, an upper limit can be used to filter out tokens that appear in relatively large number of documents (e.g., a majority of documents in the corpus). Such tokens may be unreliable indicators of whether a particular document includes sensitive information. Thus, by reducing the number of tokens in this way, training time can be reduced with little or no impact on model accuracy.

The plurality of feature vectors may be arranged into a matrix (referenced as the "TF-IDF matrix" in FIG. 10). The matrix can have columns corresponding to tokens, rows corresponding to documents within the training dataset, and cells corresponding to calculated frequency values. An additional column may be added to the matrix indicating which classification or label a document within the training dataset has been assigned (e.g., "sensitive" or "not sensitive").

TfidfVectorizer has the option to use the logarithmic form for the frequency calculation. This can be useful because, according to Zipf's law, the frequency words within a corpus of documents follows an exponential distribution. TfidfVectorizer also allows the user to specify the range of n-grams that appear in the generated feature vectors (an "n-gram" is a continuous sequence of n terms of text). It is appreciated herein that it may be desirable to specify an n-gram range in situations (e.g., for particular domains) where sensitive information is more likely to be found in sequences of terms versus in individual terms. Further, using TfidfVectorizer, the generated feature vectors can be normalized such that the sum of squares of each vector is equal to one. Normalization may be used to prevent the length of the document from affecting the term frequency.

At block 1012, the matrix of feature vectors may be provided as input into a ML training engine to generate a trained ML model. Various ML techniques can be used, such as LR, SVM, and NN. During the training process, a model can learn the pattern of the term frequencies corresponding to the sensitive documents and to the non-sensitive documents. As such, the techniques disclosed herein can be used to generate trained models useful for predicting whether an "unseen" document (i.e., a document not in the training dataset) is sensitive or non-sensitive.

In some embodiments, process 1000 can further include optimizing the trained model using one or more of the optimization techniques and metrics described above in the context of FIG. 9.

While process 1000 is described as training models for detecting text-based content (and documents in particular), the concepts and structures sought to be protected herein can also be applied to detect sensitive image-based content. In this case, Convolutional Neural Network (CNN) models techniques may be used. In some embodiments, such CNN models can be trained using the Keras and/or TensorFlow Python libraries. CNN models can be used to detect sensitive images within a client device using, for example, using the TensorFlow.js JavaScript library. When training a CNN model, various parameters may be selected in an empirical and/or domain-specific manner, including for example the number of hidden layers in the neural network, the activation function to be used, the number of filters used for feature extraction, learning rate, etc.

Figure 11:
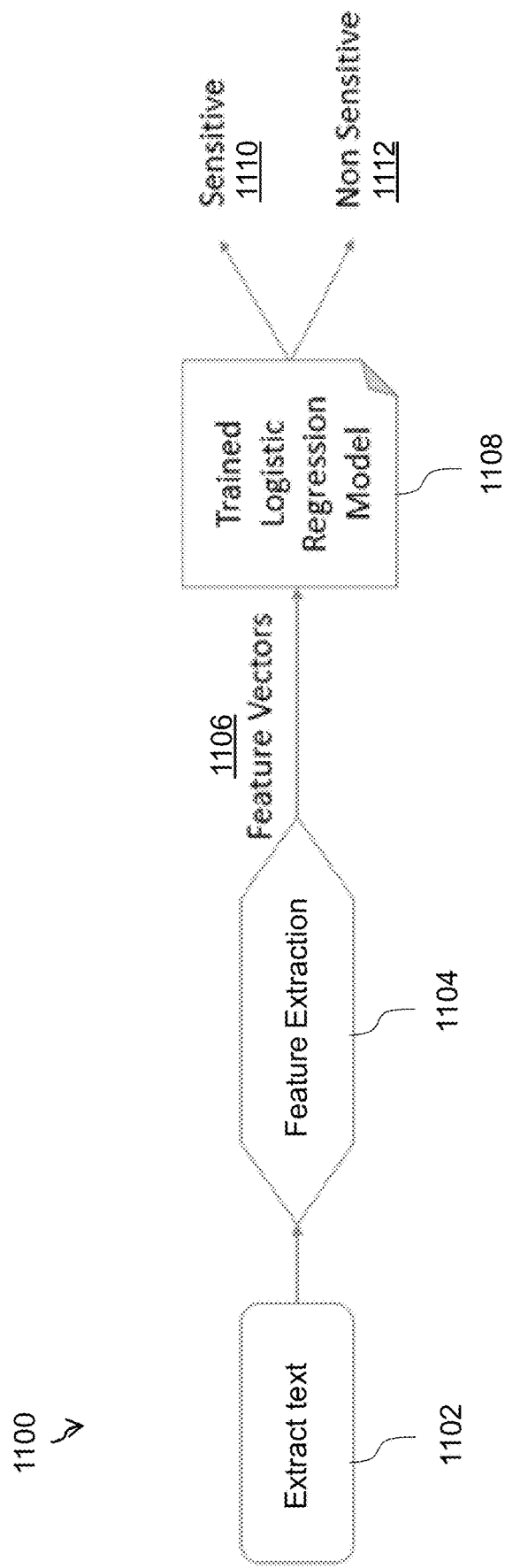
FIG. 11 is a flow diagram of an illustrative process for detecting sensitive content, according to an embodiment of the present disclosure.

FIG. 11 shows an illustrative process 1100 for classifying content (e.g., a document) as sensitive or non-sensitive, according to an embodiment of the present disclosure. Process 1100 may be implemented, for example, within a client device (e.g., client device 502 of FIG. 5) and/or within a gateway device (e.g., gateway device 640 of FIG. 6).

At block 1102, content may be received (e.g., in response to a user of a client device accessing content within a cloud service or other network resource) and text may be extracted from the content. If the content is image-based, the text may be extracted using OCR or other computer vision (CV) technique. If the content is text-based, then the text may be extracted using a document reader/parser selected based on the content type or other metadata associated with the content.

At block 1104, a feature extraction process may be performed on the extracted text to generate one or more feature vectors 1106. The processing of block 1104 may be the same as or similar to the processing of block 1004 shown in FIG. 10 and described in detail above.

At block 1108, a trained ML model may be selected and used to classify the content as sensitive 1110 or not sensitive 1112. The ML model may be a domain-specific model selected using various factors related to context in which the content is being accessed. Any of the techniques previously discussed for selecting a suitable ML can be used.

Figure 12:
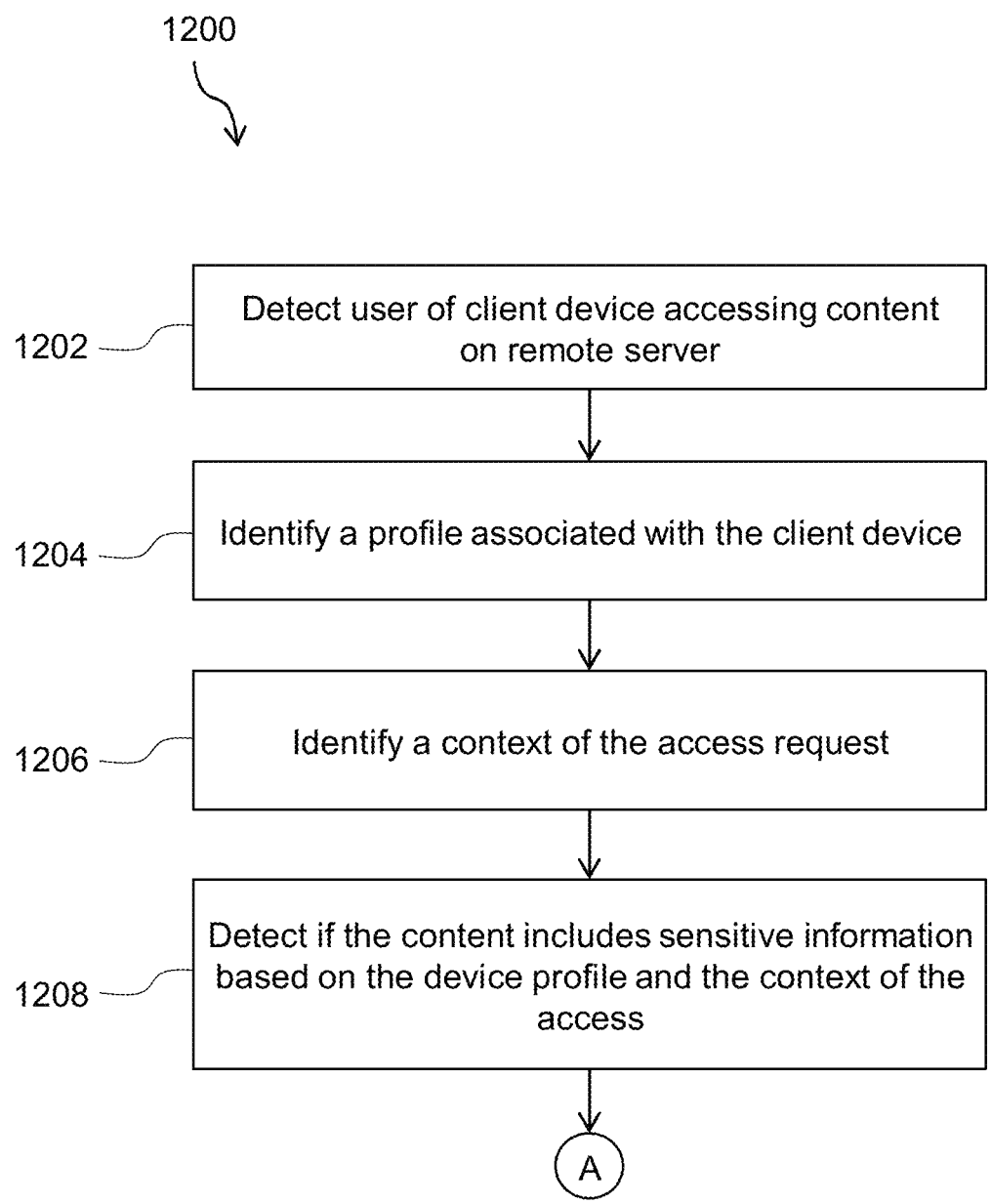
FIG. 12 is a flow diagram of an illustrative process for restricting access to sensitive content, according to an embodiment of the present disclosure.
Figure 12:
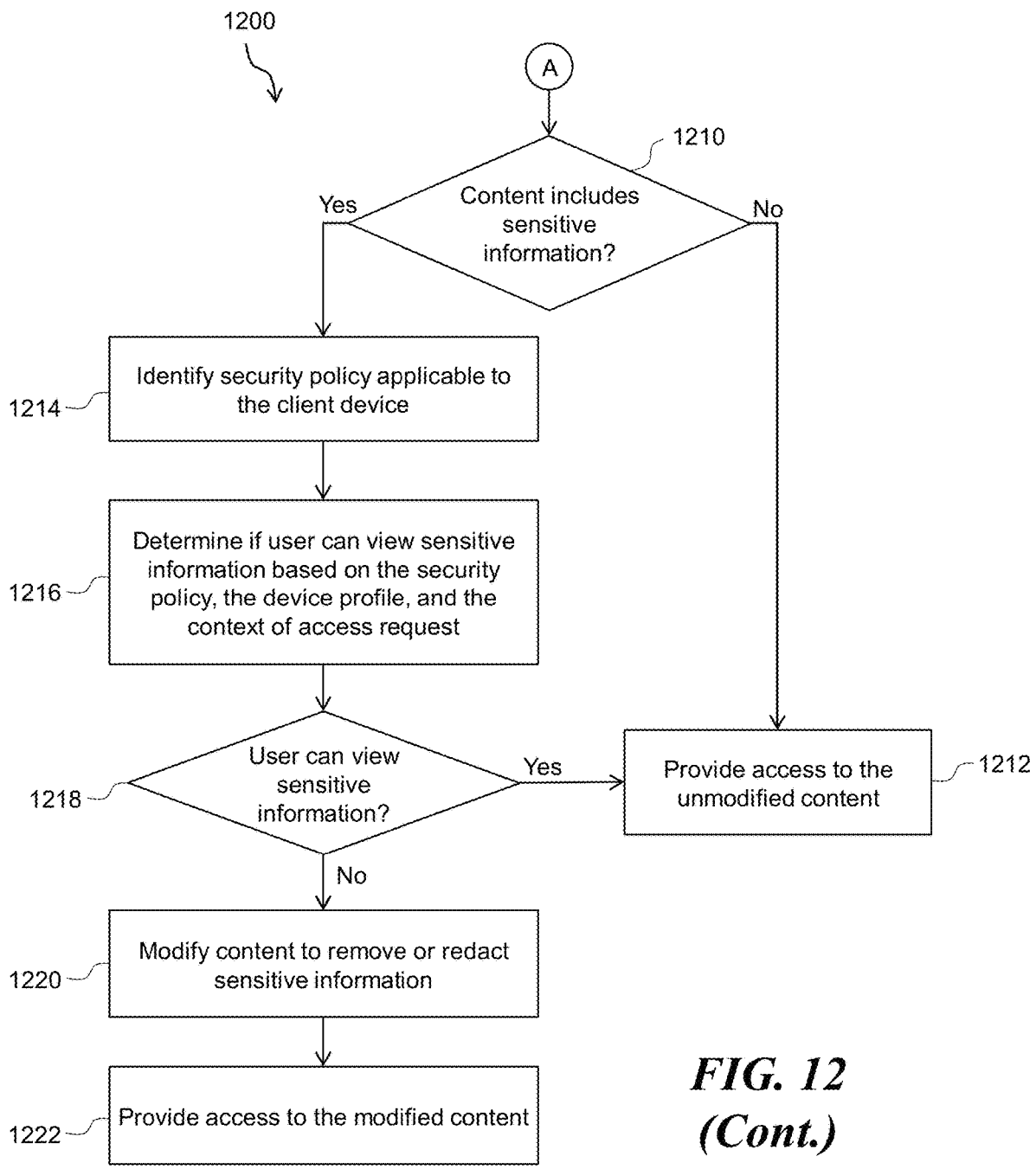

Turning to FIG. 12, an illustrative method 1200 can be used to provide restricted access to sensitive content, according to an embodiment of the present disclosure. Process 1200 may be implemented, for example, within a client device (e.g., client device 502 of FIG. 5) and/or within a gateway device (e.g., gateway device 640 of FIG. 6).

At block 1202, it can be detected that a user of a client device is accessing content on a remote server. For example, the user's device may detect that the user is copying, pasting, sharing, or viewing content stored on a remote network resource. In some embodiments, a secure access app installed on the device (e.g., app 712 of FIG. 7) can intercept or otherwise detect when the user is interacting with GUI controls (e.g., buttons, links, scrollbars, menu items, etc.) associated with a copy/paste/share/view action. As another example, a gateway device can intercept a request to access content sent from a client device to an on-prem desktop/app.

At block 1204, a device profile associated with the client device may be identified. Techniques for identifying a device profile are described above in the context of FIGS. 5, 6, 7, and 8. For example, in the case where method 1200 is performed on a client device, the device profile can be identified as the device profile 728 (FIG. 7) stored on the device. As another example, in the case where method 1200 is performed on a gateway device, the device profile can be identified from among a set of device profiles 828 (FIG. 8) associated with an organization based on information in the request sent from the client device to the gateway device. At block 1206, a context associated with the access may be identified. As previously discussed, "context" can refer to factors associated with the request such as the type of access the user is attempting (e.g., downloading vs. viewing vs. sharing), the particular cloud service or other network resource the content is being accessed from (e.g., the name or type of SaaS or web application being accessed), the type of content being accessed, other metadata associated with the content, the location of the device from which the access is occurring, the time or day of week when access is occurring, whether the device is secure (e.g., whether the device has passed one or more security checks), the type of network connection over which the access is occurring (e.g., a VPN or other private/secure connection vs. a public/insecure connection). Any or all of these factors can be identified as part of block 1206. For example, block 1206 can include identifying the type of access the user is attempting based on information in the request or GUI events detect on the client device. As another example, block 1206 can further include identifying the device location based information in the request using a geolocation service, or based on geolocation data generated at the client device. e.g., using a Global Positioning System (GPS) receiver.

At block 1208, it can be detected if the content includes sensitive information based on the device profile and/or the context of the access. In some embodiments, block 1208 can include selecting one or more domain-specific trained models and using the selected models to detect sensitive content. The domain-specific trained model(s) can be selected based on the device profile and the context of the request. In more detail, the client device or gateway device in which method 1200 is being performed may store or otherwise have access to multiple trained models and model may be selected therefrom based on attributes of the user device, the organization, and/or the context of the request. For example, the model may be selected based on the industries or sectors in which the organization operates. As another example, the model may be selected based on contextual factors such as the type of access the user is attempting, the particular cloud service or other network resource from which the content is being accessed, the type of content being accessed (e.g., image-based content vs. text-based content), other metadata associated with the content, the time/day when the access is occurring, the type of network connection over which the access is occurring, etc. In the case of text-based content, block 1208 can include generating a vector representation of the text content using techniques described in detail above.

At decision block 1210, if the content does not include sensitive information, then (block 1212) access to the original/unmodified content may be provided to the user. Otherwise process 1200 may proceed to block 1214.

At block 1214, an organization's security policy applicable to the client device and/or user may be identified. Various types of security policies that can be defined for an organization are described above in the context of FIG. 5 (more particularly in the context of policy server 506) and techniques for selecting applicable security policy for a client device/user are described above in the context of FIG. 9. In some embodiments, applicable security policy may be selected by the policy server and delivered to the client device where it is stored (e.g., by secure access app 712 of FIG. 7). Here, block 1214 may correspond to the actions of the policy server in selecting the appropriate security policy and/or to the actions of the client device in retrieving the stored security policy. In some embodiments, a gateway device may identify applicable security policy for a given request (e.g., a request sent by a client device) based on information within the request (e.g., information identifying the device, the user, or the organization).

At block 1216, it can be determined if the user is permitted to view the sensitive information based on the applicable security policy, the device profile, and/or the context of the access request. For example, an organization may define a security policy that permits only certain users to view sensitive content. Here, block 1216 can identify the user accessing the sensitive content based on the device profile and then determine if that user is allowed to view the sensitive content based on this security policy. Other examples of security policies that can be used to determine if the user is permitted to review sensitive information are discussed above, e.g. in the context of FIG. 5 (more particularly in the context of policy server 506).

At block 1218, if the user is permitted to review the sensitive information, then (at block 1212) access to the original/unmodified content may be provided to the user. Otherwise process 1200 may proceed to block 1220.

At block 1220, the content may be modified to remove/redact the sensitive information. This can include using a document editing library or service to remove portions of the content that include the sensitive information. Then, at block 1222, the modified content may be provided to the user.

Embodiments of the present disclosure can be used to restrict access to sensitive content under various use cases. For example, in some embodiments, if a user attempts to access a PDF document that includes confidential information from an insecure location or over an insecure network, the confidential information in the PDF document may be redacted before displaying the document to the user. As another example, if a user attempts to upload a confidential document to SaaS application that the user's organization deems insecure, the user's device may prevent the user from uploading the document or may redact/remove the confidential information before allowing it to be uploaded.

Methods and processes described herein may represent processing that occurs within a computer system or computer network. The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A method comprising:
    detecting, by a client device, a request to access content located on a remote server;
    determining, by the client device, that the requested content includes sensitive information based on a profile associated with the client device and a context in which the content is being accessed, comprising:
    extracting text from the requested content;
    generating one or more feature vectors based on the extracted text; and
    using the one or more feature vectors and one or more trained models to detect the sensitive information of the requested content, wherein a training of the one or more models comprise:
        receiving a training dataset comprising one or more sensitive documents and one or more non-sensitive documents;
        for individual documents in the training dataset, extracting tokens from text of the document, performing a Term Frequency-Inverse Document Frequency (TF-IDF) calculation using the tokens, and generating feature vectors based on the TF-IDF calculation; and
        using the feature vectors generated for individual documents in the training dataset to generate the one or more trained models;
    modifying, by the client device, the requested content in response to the determination that the content includes sensitive information; and
    providing, by client device, access to the modified content in place of the requested content that includes the sensitive information.

2. The method of claim 1, wherein the determination that the requested content includes sensitive information is further based on metadata associated with the content.

3. The method of claim 1, wherein the determination that the requested content includes sensitive information further includes analysis of the requested content using the one or more trained models selected based on the user profile.

4. The method of claim 3, further including selecting the one or more trained models based on attributes of an organization with which the requested content is associated.

5. The method of claim 1, wherein the extraction of the text from the requested content includes using Optical Character Recognition (OCR) to extract the text.

6. The method of claim 1, wherein the detection of the access to the requested content located on the remote server and the determination the requested content includes sensitive information is performed by a browser application of the client device.

7. The method of claim 6, wherein the requested content is located within a Software-as-a-Service (SaaS) application.

8. The method of claim 1, wherein the modification of the requested content includes a change to a document using an application programming interface (API), and the API being selected based on a file type of the content.

9. The method of claim 1, wherein the request to access the content includes a request to upload, download, share, copy, or paste the content.

10. The method of claim 1, wherein the performing of the TF-IDF calculation using the tokens comprises:
    calculating a Document Frequency (DF) value for each of the tokens; and
    determining which of the tokens to include in the feature vectors for the individual documents in the training dataset based on the calculated DF value for each of the tokens.

11. A device comprising:
    a memory; and
    a processor coupled to the memory and configured to:
        access content of an application, the content including sensitive information, and the application being executable on a remote computing device;
        detect the sensitive information of the content based on at least one of a user profile and a context in which the content is being accessed, comprising:
        extract text from the requested content;
        generate one or more feature vectors based on the extracted text; and
        using the one or more feature vectors and one or more trained models to detect the sensitive information of the requested content, wherein a training of the one or more models comprise:
            receive a training dataset comprising one or more sensitive documents and one or more non-sensitive documents;

for individual documents in the training dataset, extract tokens from text of the document, perform a Term Frequency-Inverse Document Frequency (TF-IDF) calculation using the tokens, and generate feature vectors based on the TF-IDF calculation; and using the feature vectors generated for individual documents in the training dataset to generate the one or more trained models; and modify the content in response to detection of the sensitive information, the modification enabling the computing device to replicate security controls applicable to local users of the application.

12. The device of claim 11, wherein the processor is configured to detect the sensitive information of the content further based on metadata associated with the content.

13. The device of claim 11, wherein the processor is configured to detect the sensitive information of the content by analyzing the content using the one or more trained models selected based on at least one of the user profile and the context in which the content is being accessed.

14. The device of claim 13, wherein the processor is configured to select the one or more trained models based on attributes of an organization with which the content is associated.

15. The device of claim 11, wherein the processor is configured to use Optical Character Recognition (OCR) to extract the text.

16. The device of claim 11, further including a browser application that, when executed by the processor, is operable to detect the sensitive information of the content and to modify the content in response to detection of the sensitive information.

17. The device of claim 16 wherein the application is a Software-as-a-Service (SaaS) application.

18. The device of claim 11, wherein the processor is configured to:
calculate a Document Frequency (DF) value for each of the tokens; and
determine which of the tokens to include in the feature vectors for the individual documents in the training dataset based on the calculated DF value for each of the tokens.

19. A method comprising:
detecting, by a gateway device, a request to access content stored on a remote server, the request being associated with a client device;
determining, by the gateway device, that the requested content includes sensitive information based on a user profile associated with the client device, comprising:
extracting text from the requested content;
generating one or more feature vectors based on the extracted text; and
using the one or more feature vectors and one or more trained models to detect the sensitive information of the requested content, wherein a training of the one or more models comprise:
receiving a training dataset comprising one or more sensitive documents and one or more non-sensitive documents;
for individual documents in the training dataset, extracting tokens from text of the document, performing a Term Frequency-Inverse Document Frequency (TF-IDF) calculation using the tokens, and generating feature vectors based on the TF-IDF calculation; and
using the feature vectors generated for individual documents in the training dataset to generate the one or more trained models;
modifying, by the gateway device, the requested content in response to the determination that the content includes sensitive information; and
providing, by gateway device, access to the modified content in place of the requested content that includes the sensitive information.

20. The method of claim 19, wherein the determination that the requested content includes sensitive information further includes analysis of the requested content using the one or more trained models selected based on the user profile associated with the client device.

* * * * *